United States Patent [19]
Higasa et al.

[11] Patent Number: 5,719,455
[45] Date of Patent: Feb. 17, 1998

[54] MTHOD OF DESIGNING A SUPERCONDUCTIVITY EMPLOYING APPARATUS AND A SUPERCONDUCTIVITY EMPLOYING APPARATUS CONSTRUCTED BY THE METHOD

[75] Inventors: Hiromasa Higasa; Fumihiko Ishikawa; Masanori Yamashita; Makoto Hirose, all of Takamatsu, Japan

[73] Assignee: Kabushiki Kaisha Shikoku Sogo Kenkyusho, Takamatsu, Japan

[21] Appl. No.: 759,119

[22] Filed: Dec. 2, 1996

[30] Foreign Application Priority Data

| Nov. 30, 1995 | [JP] | Japan | 7-311866 |
| Apr. 1, 1996 | [JP] | Japan | 8-078910 |
| Jul. 29, 1996 | [JP] | Japan | 8-199369 |
| Oct. 21, 1996 | [JP] | Japan | 8-277722 |

[51] Int. Cl.$^6$ .............................. B60L 13/04; H02K 7/09
[52] U.S. Cl. ........................ 310/90.5; 505/876; 505/878
[58] Field of Search ................. 335/216; 310/90.5; 505/877, 878, 876, 903, 879

[56] References Cited

U.S. PATENT DOCUMENTS

| 5,177,387 | 1/1993 | Mcmichael et al. | 310/90.5 |
| 5,220,232 | 6/1993 | Rigney, II et al. | 310/90.5 |
| 5,396,136 | 3/1995 | Pelrine | 310/90.5 |
| 5,633,548 | 5/1997 | Takahata et al. | 310/90.5 |

FOREIGN PATENT DOCUMENTS 5180225   7/1993   Japan .

Primary Examiner—Michael L. Gellner
Assistant Examiner—Raymond Barrena
Attorney, Agent, or Firm—Jacobson, Price, Holman & Stern, PLLC

[57] ABSTRACT

A method of designing a superconductivity employing apparatus includes the steps of causing a magnetism generating disk-shaped floatable portion (4) to face a disk-shaped fixed portion (2) capable of exhibiting superconductivity with a gap (G) therebetween; initializing the fixed portion (2) to reach a superconducting state at a position where the floatable portion (4) is spaced away from the fixed portion (2) to such an extent that its magnetic field does not influence the fixed portion (2); and using properly first, second, and n-th approach characteristics (S1, S2, Sn) when a difference between an n-th approach characteristic (Sn) and the second characteristic (S2) is smaller than a difference between the first and second characteristics (S1, S2), where the first approach characteristic (S1) is a characteristic of a magnetic floating force obtained by allowing the floatable portion (4) to approach the fixed portion (2), the second approach characteristic (S2) is a characteristic of a magnetic floating force obtained by allowing the floatable portion (4) to approach the fixed portion (2) after the floatable portion (4) is allowed to recede from the fixed portion (2) to such an extent that its magnetic field does not influence the fixed portion (2), and the n-th approach characteristic is a characteristic of a magnetic floating force obtained by repeatedly carrying out the operations subsequent to the operation of the second approach characteristic (S2).

9 Claims, 23 Drawing Sheets

DRIFT OF R1 (GAP TIME-SERIES CHARACTERISTIC WHEN THE LOAD OF 5 KGF IS APPLIED)

DRIFT OF R2 (GAP TIME-SERIES CHARACTERISTIC WHEN THE LOAD OF 5 KGF IS APPLIED)

MTHOD OF DESIGNING A SUPERCONDUCTIVITY EMPLOYING APPARATUS AND A SUPERCONDUCTIVITY EMPLOYING APPARATUS CONSTRUCTED BY THE METHOD

BACKGROUND OF THE INVENTION

1. Field of the Invention

This invention relates to a method of designing a superconductivity employing apparatus and a superconductivity employing apparatus constructed by the method.

2. Description of the Art

An apparatus which employs superconductivity (hereinafter referred to as a superconducting apparatus) is known in which a type II superconductor is used to magnetically float or suspend (hang) a magnetic disk in a non-contacting and rotating manner. For example, there is a CFRP flywheel power storage apparatus in which a superconductive magnetic bearing is used to rotate a flywheel in a non-contacting manner and convert electric power to kenetic energy in order to store the energy. For putting the superconducting apparatus to practical use, in other words, for avoiding a failure in designing and constructing the apparatus, it is desirable to carefully and deeply analyze characteristics of a magnetic floating force of the superconductor with respect to a gap, and characteristics of a magnetic suspending force (a magnetic hanging force) with respect to a gap or a deviation.

However, in the past, the superconducting apparatus has been design and constructed without closely considering a characteristic of the magnetic floating force with respect to the gap (hereinafter referred to as a magnetic floating force characteristic) and a characteristic of the magnetic suspending force with respect to the gap or the deviation (hereinafter referred to as a magnetic suspending force characteristic). Thus, a problem for solution still resides in that the superconducting apparatus which has been constructed exhibits a drift phenomenon which makes it impossible to obtain stable characteristics of the magnetic floating force or stable characteristics of the magnetic suspending force according to predetermined design.

SUMMARY OF THE INVENTION

The present invention was made in view of the foregoing. It is an object of the present invention to provide a method of designing a superconducting apparatus and provide a superconducting apparatus constructed by the method, which is capable of obtaining stable characteristics of the magnetic floating force or stable characteristics of the magnetic suspending force according to predetermined design.

A method of designing a superconducting apparatus according to an aspect of the present invention is characterized in that a magnetism generating disk-shaped floatable portion is caused to be opposite, with a gap, to and above a disk-shaped fixed portion capable of exhibiting a superconductive state and, with respect to characteristics of a magnetic floating force acting between the floatable portion and the fixed portion, the fixed portion is initialized from a non-superconductive state to a superconductive state at a position where the floatable portion is spaced away from the fixed portion to such an extent that a magnetic field of the floatable portion does not influence the fixed portion and, when a difference between each approach characteristic of an n-th approach characteristic group ("-th" is a suffix representing an ordinal number) and a second approach characteristic is substantially smaller than a difference between a first approach characteristic and the second approach characteristic, the first approach characteristic, the second approach characteristic, and each approach characteristic of the n-th approach characteristic group are properly used to construct a superconducting apparatus, where the first approach characteristic is a magnetic floating force characteristic which is obtained by allowing the floatable portion to approach the fixed portion, the second approach characteristic is a magnetic floating force characteristic which is obtained by allowing the floatable portion to approach the fixed portion after the floatable portion is spaced away from the fixed portion to such an extent that a magnetic field of the floatable portion does not influence the fixed portion subsequently to the operation step of the first approach characteristic, and the n-th approach characteristic group is a group of magnetic floating force characteristics which are obtained by repeating operation steps subsequent to the operation step of the second approach characteristic.

A method of designing a superconducting apparatus according to another aspect of the present invention is characterized in that a magnetism generating disk-shaped suspendible portion is caused to be opposite, with a gap, to and under a disk-shaped fixed portion capable of exhibiting a superconductive state and, with respect to characteristics of a magnetic suspending force acting between the suspendible portion and the fixed portion, the fixed portion is initialized from a non-superconductive state to a superconductive state at a place where the suspendible portion is close to the fixed portion and, when a difference between each recession characteristic of an n-th recession characteristic group and a second recession characteristic is substantially smaller than a difference between a first recession characteristic and the second recession characteristic, the first recession characteristic, the second recession characteristic, and each recession characteristic of the n-th recession characteristic group are properly used to construct a superconducting apparatus, where the first recession characteristic is a magnetic suspending force characteristic which is obtained by separating the suspendible portion from the fixed portion to such an extent that a magnetic field of the suspendible portion does not influence the fixed portion, the second recession characteristic is a magnetic suspending force characteristic which is obtained by separating the suspendible portion from the fixed portion to such an extent that a magnetic field of the suspendible portion does not influence the fixed portion after the suspendible portion is allowed to approach the fixed portion subsequently to the operation step of the first recession characteristic, and the n-th recession characteristic group is a group of magnetic suspending force characteristics which are obtained by repeating operation steps subsequent to the operation step of the second recession characteristic.

A method of designing a superconducting apparatus according to still another aspect of the present invention is characterized in that a magnetism generating hollow cylindrical movable portion which is located radially and outwardly from a hollow cylindrical fixed portion and surrounds the fixed portion is caused to be opposite, with a gap, to the hollow cylindrical fixed portion capable of exhibiting a superconductive state, and a spatial position where a geometrical midpoint of the fixed portion in a height direction and a geometrical midpoint of the movable portion in a height direction are caused to coincide with each other in a horizontal direction is defined as a coordinate origin and, with respect to characteristics of a magnetic suspending force acting between the movable portion and the fixed portion when the movable portion is deviated upward and downward from the coordinate origin, when the movable portion is situated at the coordinate origin, the hollow cylindrical fixed portion is initialized from a non-superconductive state to a superconductive state and, when a difference between each deviation characteristic of an n-th deviation characteristic group and a second deviation characteristic is substantially smaller than a difference between a first deviation characteristic and the second deviation characteristic, the first deviation characteristic, the second deviation characteristic, and each deviation characteristic of the n-th deviation characteristic group are properly used to construct a superconducting apparatus, where the first deviation characteristic is a magnetic suspending force characteristic which is obtained by deviating the midpoint of the movable portion downward from the coordinate origin, the second deviation characteristic is a magnetic suspending force characteristic which is obtained by deviating the midpoint of the movable portion downward from the coordinate origin after the movable portion is returned to the coordinate origin subsequently to the operation step of the first deviation characteristic, and the n-th deviation characteristic group is a group of magnetic suspending force characteristics which are obtained by repeating operation steps subsequent to the operation step of the second deviation characteristic.

According to the method of designing a superconducting apparatus of the present invention, it is possible to, according to predetermined design, construct a superconducting apparatus having characteristics of a magnetic floating force or magnetic suspending force by beforehand considering a floating phenomenon, called drift, which is accompanied by a hysteresis characteristic.

DETAILED DESCRIPTION OF THE PREFERRED EMBODIMENTS

First Embodiment

Figure 1:
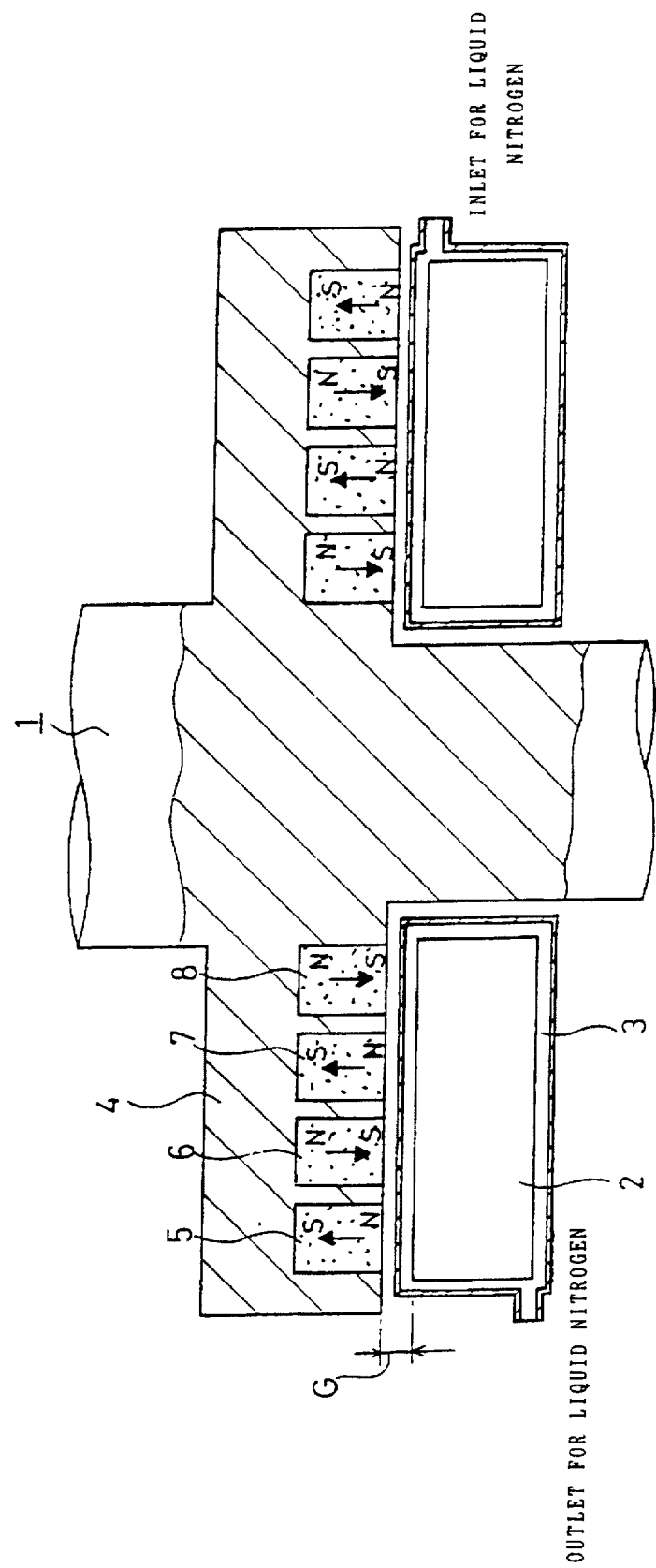
FIG. 1 is an explanatory view for explaining a method of designing a superconducting apparatus according to an aspect of the present invention and is a partly sectional view of a magnetism generating disk-shaped floatable portion and a disk-shaped fixed portion.
Figure 2:
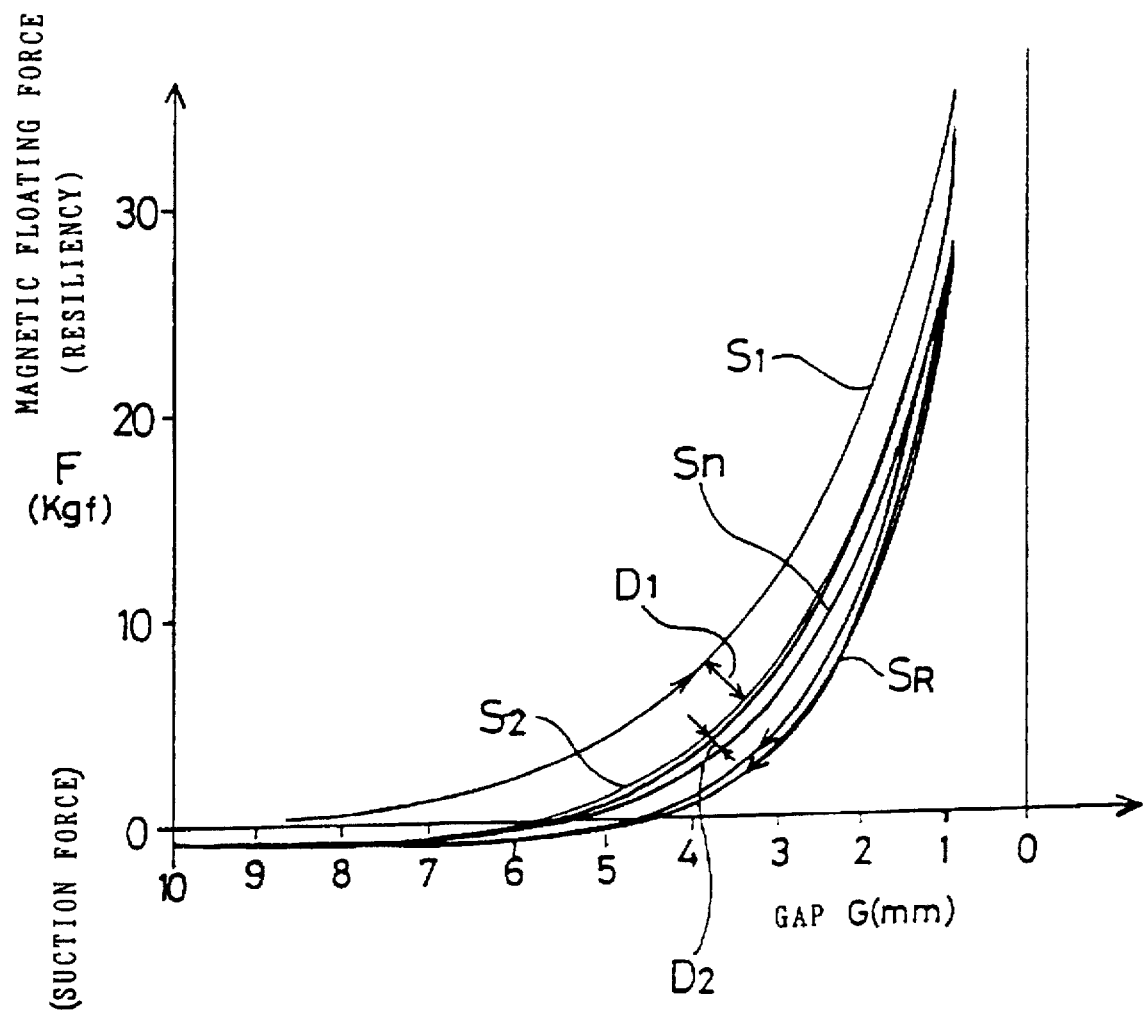
FIG. 2 is a characteristic diagram of a magnetic floating force acting between the floatable portion and the fixed portion shown in FIG. 1.

FIGS. 1 to 4 are views for explaining a method of designing a superconductivity employing apparatus (hereinafter referred to as a superconducting apparatus) according to an aspect of the present invention. In FIG. 1, reference numeral 1 designates a rotating shaft, and reference numeral 2 designates a disk-shaped fixed portion comprising a type II superconductor (i.e., a superconductor of the second kind). The type II superconductor is contained in a crysostat 3. The rotating shaft 1 has a magnetism generating disk-shaped floatable portion 4 formed integrally therewith. The magnetism generating disk-shaped floatable portion 4 has annular magnets 5, 6, 7 and 8 in the lower part thereof. The annular magnets are arranged in order radially from the inside, and polarities of the adjacent annular magnets are opposite in direction to each other. The floatable portion 4 is caused to face the fixed portion 2 with a Gap G therebetween. A magnetic floating force acts between the floatable portion 4 and the fixed portion 2. With respect to characteristics of the magnetic floating force, the fixed portion 2 is initialized from a non-superconductive state to a superconductive state by pouring liquid nitrogen into the cryostat 3 so as to cool the fixed portion 2 at a position where the floatable portion 4 is allowed to recede from the fixed portion 2 to such an extent that a magnetic field of the floatable portion 4 does not influence the fixed portion 2. Subsequently, a magnetic floating force characteristic in which a powerful floating force is obtained by allowing the floatable portion 4 to approach the fixed portion 2 is defined as a first approach characteristic S1 (see FIG. 2). In FIG. 2, the axis of ordinates indicates the magnetic floating force (i.e., resiliency) F (kilogram-force abbreviated kgf), and the axis of abscissas indicates the gap G. In this embodiment, the gap G was varied from 1 mm to 10 mm.

In actual practice, the first approach characteristic S1 was measures according to the following procedure. First of all, the magnetism generating disk-shaped floatable portion 4 is brought into a semi-fixed state. After that, the disk-shaped fixed portion 2 is brought into a superconductive state by pouring liquid nitrogen into the cryostat 3 and cooling the fixed portion 2 at a position where the disk-shaped fixed portion 2 is lowered with respect to the floatable portion 4 to such an extent that a magnetic field of the floatable portion 4 does not influence the fixed portion 2. Subsequently, the first approach characteristic S1 is measured while moving up the fixed portion 2 and allowing the fixed portion 2 to approach the floatable portion 4 up to a gap of 1 mm without breaking off the concentric or coaxial relationship between the fixed portion 2 and the floatable portion 4.

Next, a magnetic floating force characteristic is defined as a second approach characteristic S2, which is obtained by allowing the floatable portion 4 to approach the fixed portion 2 up to a gap of 1 mm after the floatable portion 4 is allowed to recede from the fixed portion 2 up to a gap of 10 mm to such an extent that a magnetic field of the floatable portion 4 can hardly influence the fixed portion 2, subsequently to the operation of the first approach characteristic S1. In addition, a group of magnetic floating force characteristics obtained by repeating operations subsequent to the operation of the second approach characteristic S2 is defined as an n-th approach characteristic group Sn. The second approach characteristic S2 and each characteristic of the n-th approach characteristic group Sn are smaller in magnetic floating force than the first approach characteristic S1.

In practice, the second approach characteristic S2 and the n-th approach characteristic group Sn were measured according to the following procedure. First of all, the magnetism generating disk-shaped floatable portion 4 is brought into a semi-fixed state. After that, the disk-shaped fixed portion 2 is returned to a position up to which the fixed portion 2 is lowered with respect to the floatable portion 4, with a gap of 10 mm therebetween, to such an extent that its magnetic field does not influence the fixed portion 2. While maintaining a concentric relationship between the fixed portion 2 and the floatable portion 4, the fixed portion 2 is moved up and is allowed to approach the floatable portion 4 up to a gap of 1 mm. A measurement result obtained in this way is defined as the second approach characteristic S2. In addition, a group of magnetic floating force characteristics obtained by repeating the operations subsequent to the operation of the second approach characteristic S2 is defined as the n-th approach characteristic group Sn. The measurement of the n-th approach characteristic group Sn was carried out 300 times. As the numerical value n (n is 3 or more) becomes larger, the characteristic variation (characteristic difference) between Sn and Sn−1 is lessened.

In FIG. 2, reference character $S_n$ designates a group of recession characteristics obtained when the floatable portion 4 is brought into a semi-fixed state and the fixed portion 2 is returned to a position where the fixed portion 2 is moved down with respect to the floatable portion 4 to such an extent that the magnetic field thereof does not influence the fixed portion 2.

As described above, when the gap G between the floatable portion 4 and the fixed portion 2 is intentionally made small or large, in other words, when the floatable portion 4 is moved up or down, the magnetic floating force characteristic presents a hysteresis phenomenon.

As can be seen in FIG. 2, with respect to each approach characteristic of the n-th approach characteristic group Sn, a difference D2 between the second approach characteristic S2 and that of the n-th approach characteristic group Sn is substantially smaller than a difference D1 between the first approach characteristic S1 and the second approach characteristic S2.

Figure 3:
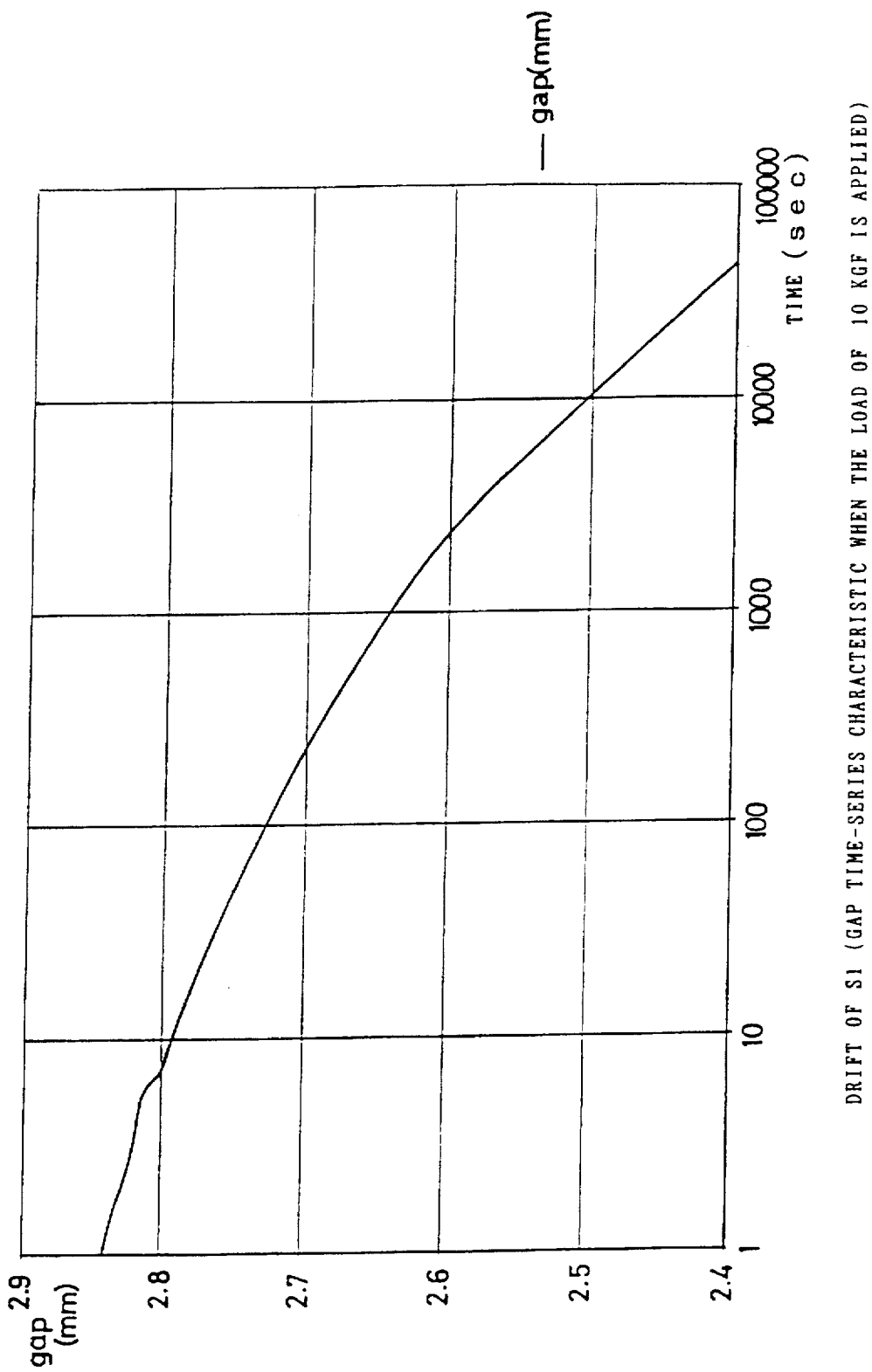
FIG. 3 is a diagram for explaining a drift of a first approach characteristic of the floatable portion shown in FIG. 1.
Figure 4:
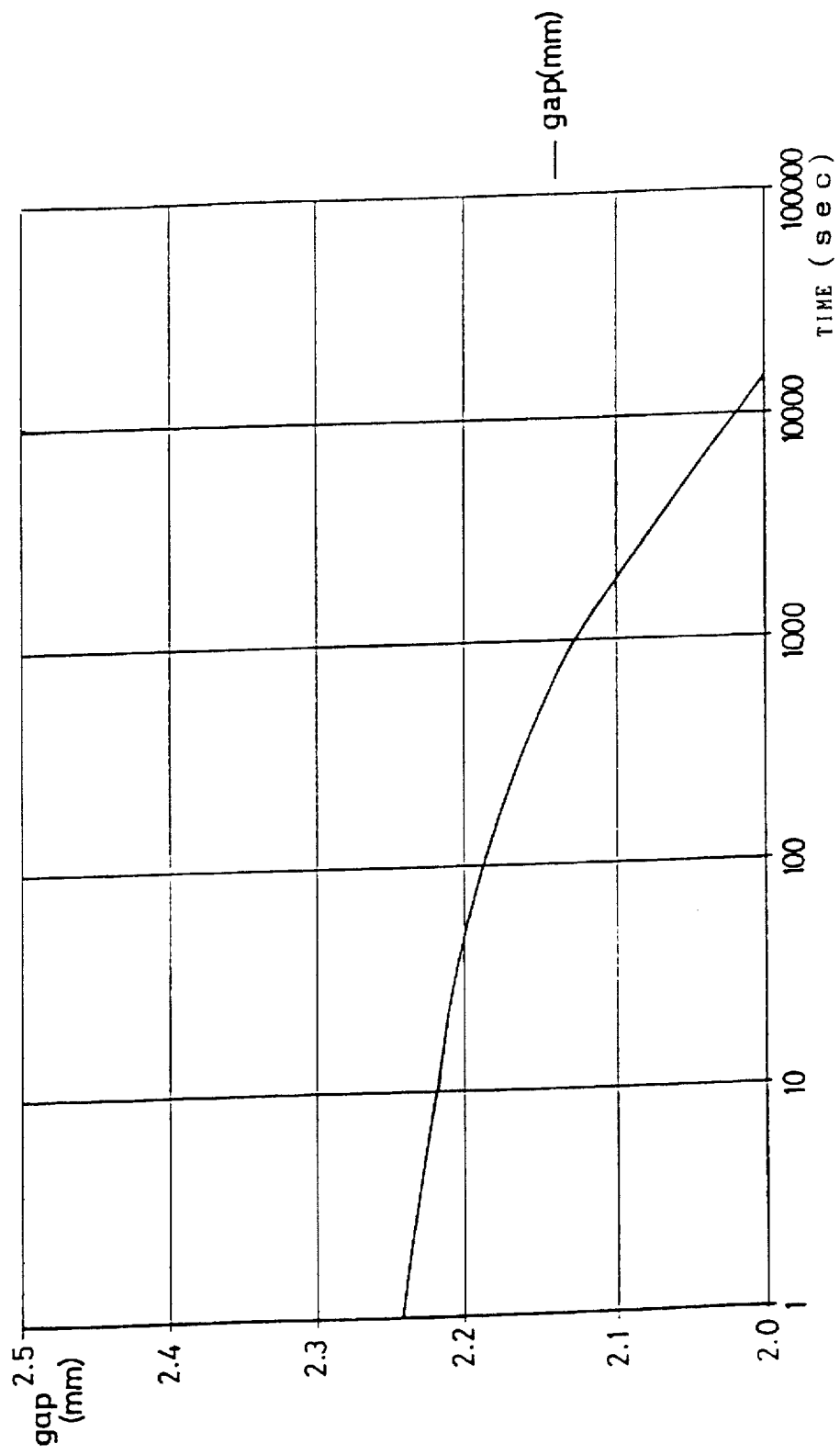
FIG. 4 is a diagram for explaining a drift of a second approach characteristic of the floatable portion shown in FIG. 1.

FIGS. 3 and 4 show measurement results of a drift with respect to the first and second approach characteristics S1 and S2. The drift is a result obtained by applying a load of 10 Kgf to the floatable portion 4 to measure time-series variations of the gap G. When the gap variation is measured from loading-time 1000 sec. to loading-time 10000 sec., the drift of the second approach characteristic S2 was 1/1.4 times to 1/1.5 times as large as that of the first approach characteristic S1.

Accordingly, if the superconducting apparatus is constructed using the second approach characteristic S2, the drift which is regarded as a variation in a direction in which the gap G is lessened can be made small. On the other hand, if the superconducting apparatus is constructed using the first approach characteristic S1, a magnetic floating force characteristic larger than the second approach characteristic S2 can be obtained.

In more detail, in a case in which the superconducting apparatus is constructed using the first approach characteristic S1, the operation of the superconducting apparatus starts at a point where the floatable portion 4 is magnetically floated when released at a rising startup part of the first approach characteristic S1 (i.e., when released immediately after initialization).

On the other hand, in a case in which the superconducting apparatus is constructed using the second approach characteristic S2, the operation of the superconducting apparatus starts at a point where the floatable portion 4 is magnetically floated which has been released immediately after passing through the first approach characteristic S1 and the recession characteristic SR, namely, which has been released at a rising startup part of the second approach characteristic S2.

In any case, if the gap G is detected to be out of an allowable range by monitoring the drift, there is a need to temporarily stop the operation of the superconducting apparatus and brink the superconductor into a non-superconductive state and thereafter bring it into a superconductive state again and, in that state, reset the first, second, or n-th approach characteristic S1, S2, or Sn. The first approach characteristic S1 is highest in frequency of reset. The reset frequency and the setting of the allowable range are determined depending on a superconducting apparatus to be used.

As described above, if the first approach characteristic S1, the second approach characteristic S2, and the n-th approach characteristic group Sn are used properly to construct the superconducting apparatus, the superconducting apparatus thus constructed can present a magnetic floating force characteristic according to predetermined design. By the use of the first approach characteristic S1, it is possible to make the superconducting apparatus small-sized and light-weight and, in addition, to reduce construction costs. By the use of the second approach characteristic S2 and the n-th approach characteristic Sn, it is possible to make the superconducting apparatus relatively small in drift.

Second Embodiment

Figure 5:
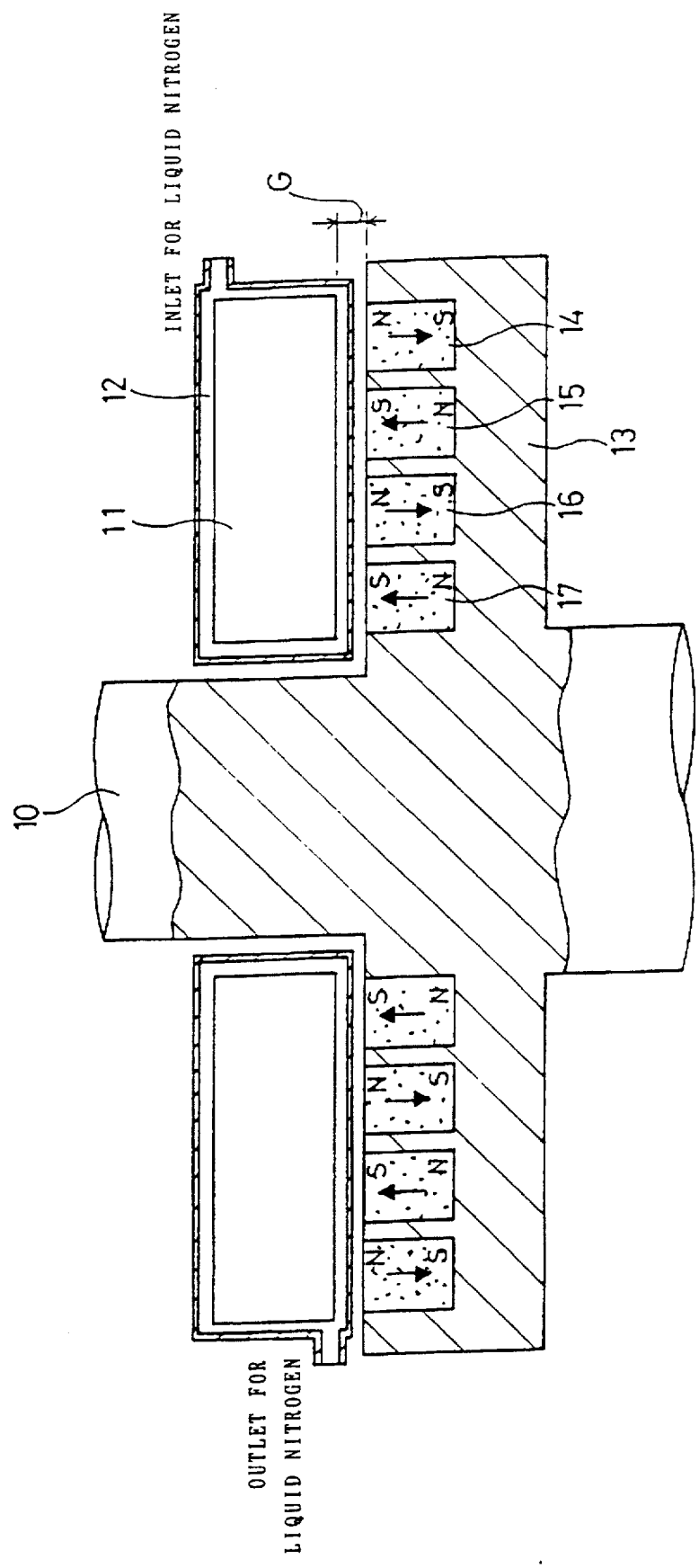
FIG. 5 is an explanatory view for explaining a method of designing a superconducting apparatus according to another aspect of the present invention and is a partly sectional view of a magnetism generating disk-shaped suspendible portion and a disk-shaped fixed portion.
Figure 6:
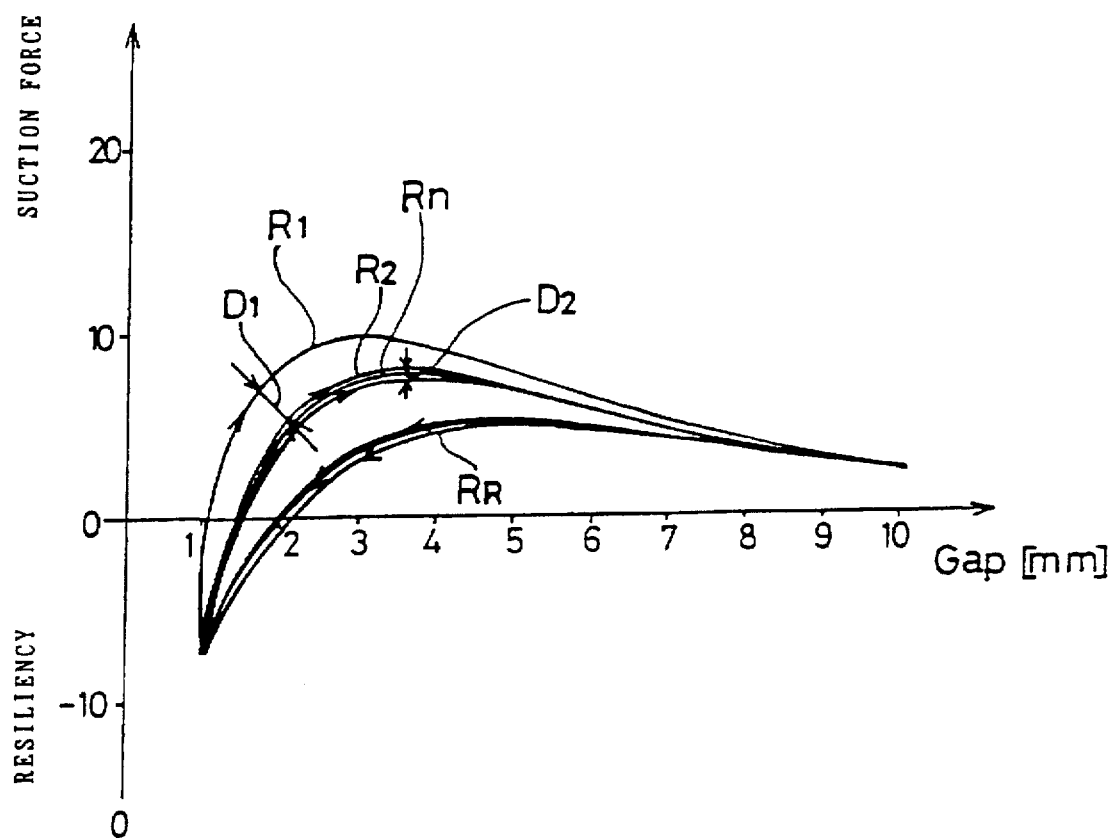
FIG. 6 is a characteristic diagram of a magnetic suspending force acting between the suspendible portion and the fixed portion shown in FIG. 5.

FIGS. 5 to 8 are views for explaining a method of designing a superconducting apparatus according to another aspect of the present invention. In FIG. 5, reference numeral 10 designates a rotating shaft, and reference numeral 11 designates a disk-shaped fixed portion comprising a type II superconductor. The type II superconductor is contained in a cryostat 12. The rotating shaft 10 has a magnetism generating disk-shaped suspend integrally 13 formed integrally with the rotating shaft 10. The magnetism generating disk-shaped suspendible portion 13 has annular magnets 14, 15, 16, and 17 in the upper part thereof. The annular magnets are arranged in order radially from the inside, and polarities of the adjacent annular magnets are opposite in direction to each other. The suspendible portion 13 is caused to face the fixed portion 11 with a gap G therebetween. A magnetic suspending force acts between the suspendible portion 13 and the fixed portion 11. With respect to characteristics of the magnetic suspending force, the fixed portion 11 is initialized from a non-superconductive state to a superconductive state by pouring liquid nitrogen into the cryostat 12 so as to cool the fixed portion 11 at a position where the suspendible portion 13 is close to the fixed portion 11. Subsequently, a magnetic suspending force characteristic in which a powerful suspending force is obtained by allowing the suspendible portion 13 to recede continuously from the fixed portion 11 is defined as a first recession characteristic R1 (see FIB. 6). In FIG. 6, the axis of ordinates indicates the magnetic suspending force (i.e., suction force) F (kgf), and the axis of abscissas indicates the gap G. In this embodiment, the gap G was varied from 1 mm to 10 mm.

In actual practice, the first recession characteristic R1 was measured according to the following procedure. First of all, the magnetism generating disk-shaped suspendible portion 13 is brought into a semi-fixed state. After that, the disk-shaped fixed portion 11 is allowed to approach the upper surface of the suspendible portion 13 up to a gap of 1 mm and is brought into a superconductive state by pouring liquid nitrogen into the cryostat 12 and cooling the fixed portion 11. Subsequently, the first recession characteristic R1 is measured while moving up the fixed portion 11 with respect to the suspendible portion 13 up to a gap of 10 mm as therebetween without breaking off the concentric relationship between the fixed portion 11 and the suspendible portion 13.

Next, a magnetic suspending force characteristic is defined as a second recession characteristic R2, which is obtained by allowing the suspendible portion 13 to approach the fixed portion 11 up to a gap of 1 mm subsequently to the operation of the first recession characteristic R1 and thereafter allowing the suspendible portion 13 to recede from the fixed portion 11 to such an extent that a magnetic field of the suspendible portion 13 does not influence the fixed portion 11. In addition, a group of magnetic suspending force characteristics obtained by repeating operations subsequent to the operation of the second recession characteristic R2 is defined as an n-th recession characteristic group Rn. The second recession characteristic R2 and each characteristic of the n-th recession characteristic group Rn are smaller in magnetic suspending force than the first recession characteristic R1.

In practice, the second recession characteristic R2 and the n-th recession characteristic group Rn were measured according to the following procedure. First of all, the magnetism generating disk-shaped suspendible portion 13 is brought into a semi-fixed state. After that, while maintaining the concentric relationship between the fixed portion 11 and the suspendible portion 13, the fixed portion 11 is moved down from the upper position and is returned to a position where the fixed portion 11 is close to the suspendible portion 13 with a gap of 1 mm therebetween. Again, while maintaining the concentric relationship therebetween, the fixed portion 11 is moved up to form a gap of 10 mm with respect to the suspendible portion 13. A measurement result obtained in this way is defined as the second recession characteristic R2. In addition, a group of magnetic suspending force characteristics obtained by repeating the operations subsequent to the operation of the second recession characteristic R2 is defined as the n-th recession characteristic group Rn. The measurement of the n-th recession characteristic group Rn was carried out 200 times. As the numerical value n (n is 3 or more) becomes larger, the characteristic variation (characteristic difference) between Rn and Rn−1 is lessened.

In FIG. 6, reference character $R_R$ designates a group of approach characteristics obtained when the suspendible portion 13 is allowed to approach the fixed portion 11 from a receded position.

As described above, when the gap G between the suspendible portion 13 and the fixed portion 11 is intentionally made small or large, in other words, when the suspendible portion 13 is moved up or down, the magnetic suspending force characteristic presents a hysteresis phenomenon.

As can be seen in FIG. 6, with respect to each recession characteristic of the n-th recession characteristic group Rn, a difference D2 between the second recession characteristic R2 and that of the n-th recession characteristic group Rn is substantially smaller than a difference D1 between the first recession characteristic R1 and the second recession characteristic R2.

Figure 7:
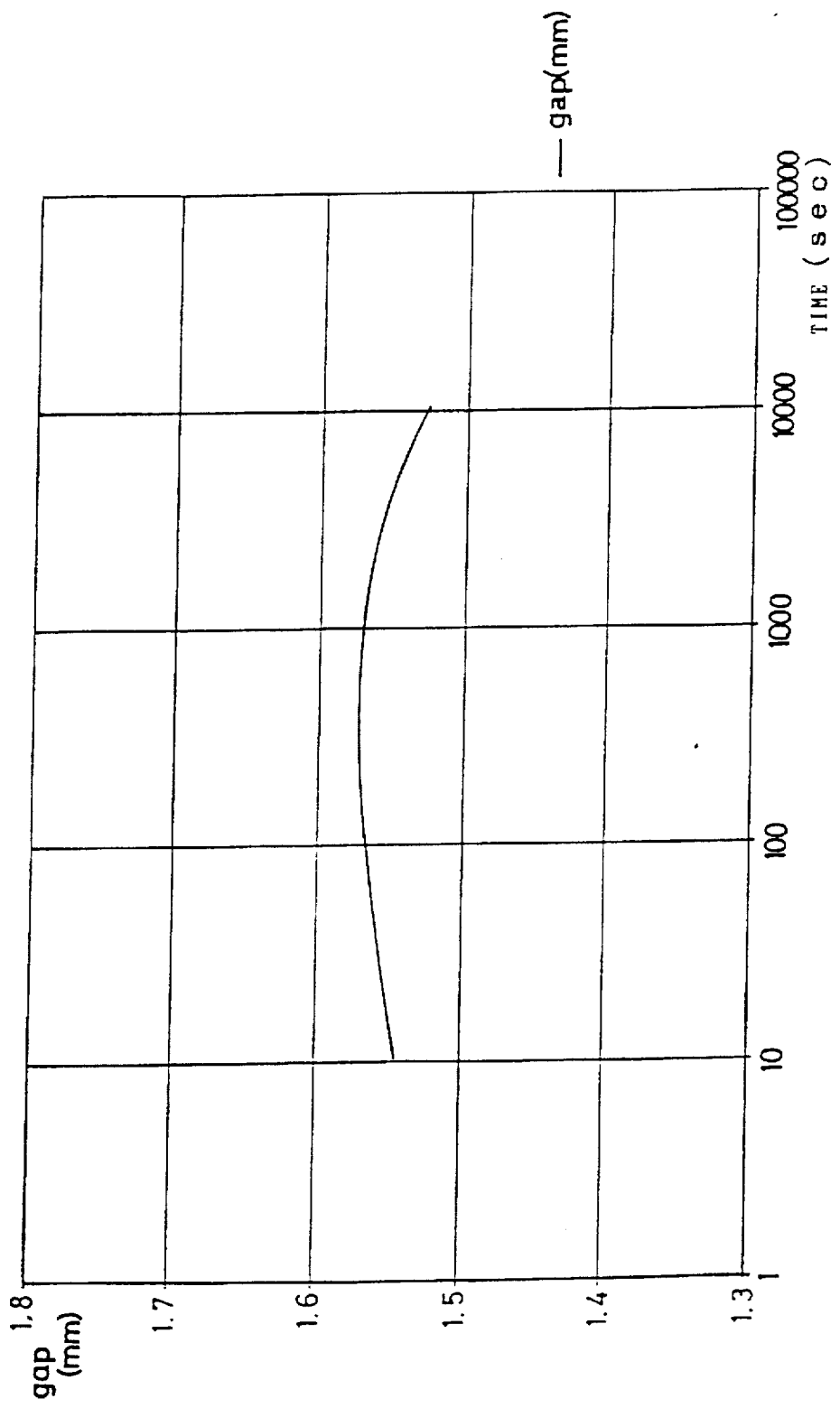
FIG. 7 is a diagram for explaining a drift of a first recession characteristic of the suspending portion shown in FIG. 5.
Figure 8:
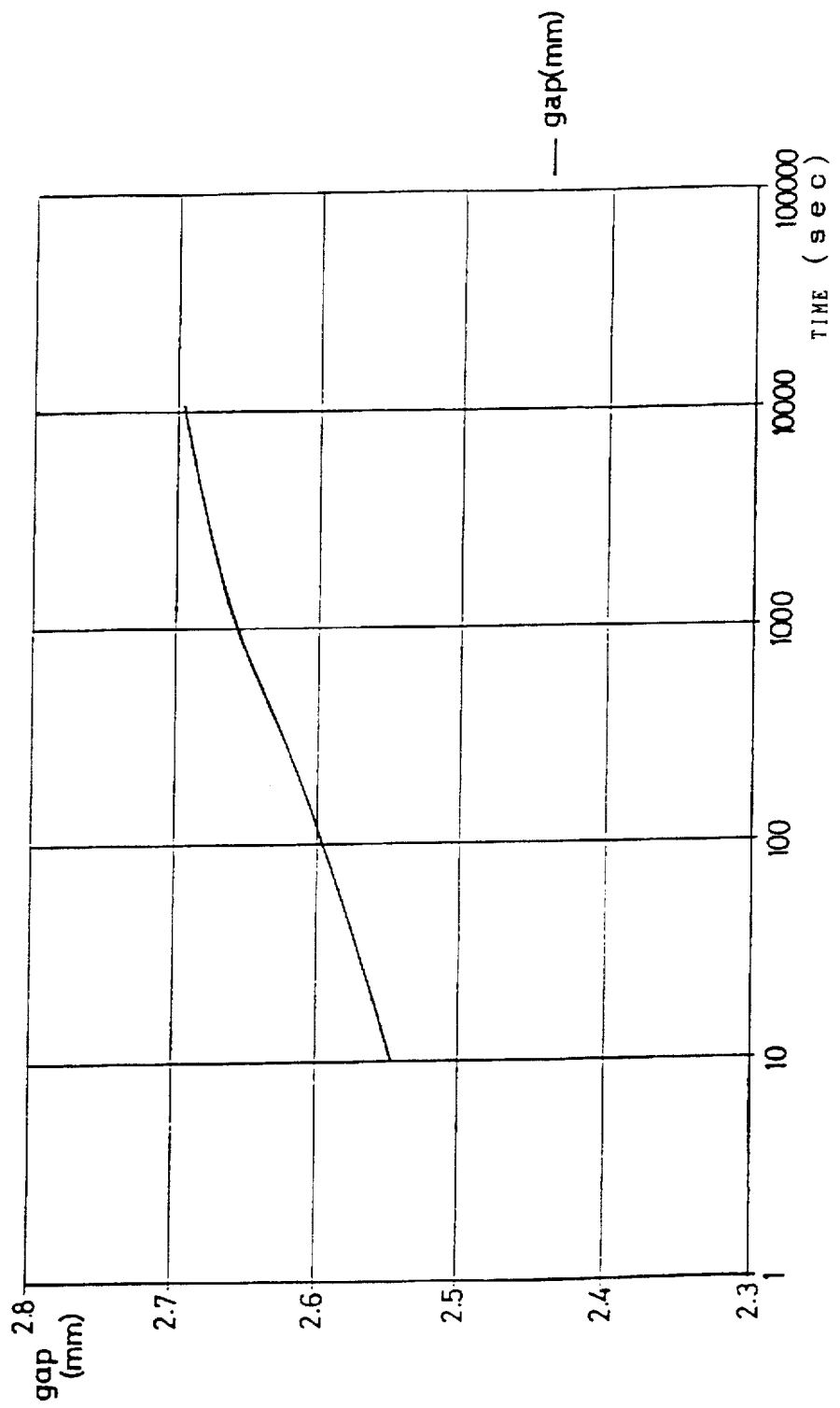
FIG. 8 is a diagram for explaining a drift of a second recession characteristic of the suspending portion shown in FIG. 6.

FIGS. 7 and 8 show measurement results of a drift about the first and second recession characteristics R1 and R2. The drift in this case is a result obtained by applying a load of 5 Kgf to the suspendible portion 13 to measure time-series variations of the gap G. When the gap variation is measured within the range of loading-time 100 sec. to loading-time 10000 sec., the drift of the first recession characteristic R1 is unstable because in the beginning it occurs in a direction in which the gap increases but, from halfway, it occurs in a direction in which the gap decreases. On the other hand, the drift of the second recession characteristic R2 has a feature in that it occurs only in a direction in which the gap increases.

In a case in which the first recession characteristic R1 is applied to the superconducting apparatus shown in FIG. 5, the operations of the superconducting apparatus start at a point where the suspendible portion 13 is lowered when released at a rising startup part of the first recession characteristic R1 (i.e., when released immediately after initialization).

In a case in which the second recession characteristic R2 is applied to the superconducting apparatus shown in FIG. 5, the operations of the superconducting apparatus start at a point where the suspendible portion 13 is lowered immediately after passing through the first recession characteristic R1 and the approach characteristic $R_R$, namely, when released at a rising startup part of the second recession characteristic R2.

In any case, if the gap G is detected to be out of an allowable range by monitoring the drift, there is a need to temporarily stop the operations of the superconducting apparatus and bring the superconductor into a non-superconductive state and thereafter reset the first, second, or n-th recession characteristic R1, R2, or Rn. The reset frequency and the setting of the allowable range are determined depending on a superconducting apparatus to be used.

Accordingly, if the first recession characteristic R1, the second recession characteristic 22, and the n-th recession characteristic Rn are used properly to construct the superconducting apparatus, the superconducting apparatus thus constructed can present a suspending force characteristic according to predetermined design. By the use of the first recession characteristic R1, it is possible to make the superconducting apparatus small-sized and light-weight and, in addition, to reduce construction costs. By the use of the second recession characteristic R2, it is possible to construct a superconducting apparatus in which the drift occurs only in a direction in which the gap increases.

Third Embodiment

Figure 9:
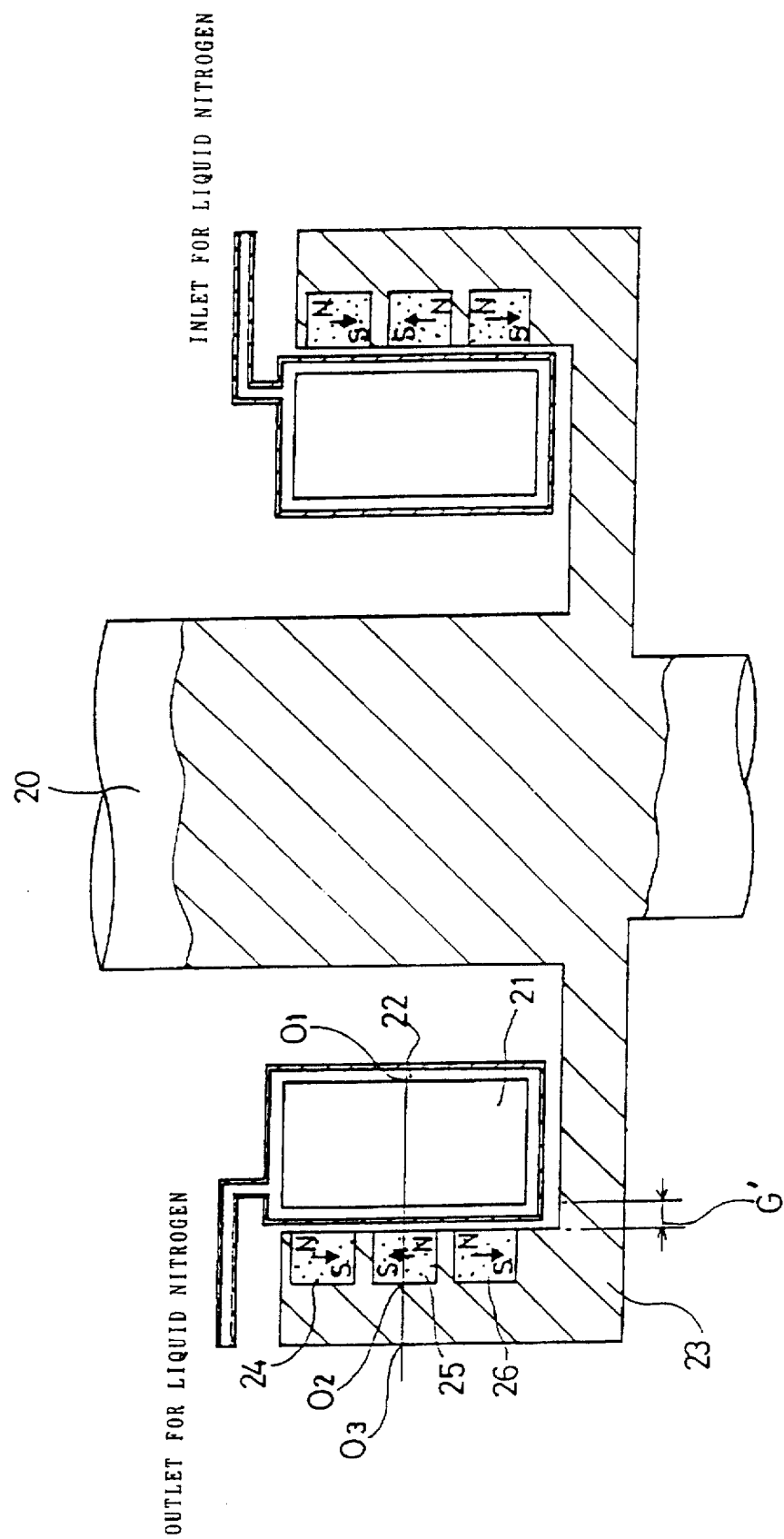
FIG. 9 is an explanatory view for explaining a method of designing a superconducting apparatus according to still another aspect of the present invention and is a partly sectional view showing a magnetism generating tubular movable portion and a tubular fixed portion.

FIGS. 9 to 12 are views for explaining a method of designing a superconductivity employing apparatus (hereinafter referred to as a superconducting apparatus) according to a still another aspect of the present invention. In FIG. 9, reference numeral 20 designates a rotating shaft, and reference numeral 21 designates a tubular fixed portion comprising a type II superconductor (i.e., superconductor of the second kind). The type II superconductor is contained in a cryostat 22. The rotating shaft 20 has a magnetism generating tubular movable portion 23 formed integrally therewith. The movable portion 23 has annular magnets 24, 25, and 26 in the inner peripheral part thereof. The annular magnets are evenly spaced in the up and down directions, and polarities of the adjacent annular magnets are opposite in direction to each other. The movable portion 23 is caused to face the fixed portion 21 with a radially unchangeable gap G' therebetween. A spatial position where a geometrical midpoint 01 of the fixed portion 21 in a height direction is caused to horizontally coincide with a geometrical midpoint 02 of the movable portion 23 in a height direction is defined as a coordinate origin 03. When the midpoint 02 of the movable portion 23 is deviated from the coordinate origin 03, a magnetic suspending force acts between the movable portion 23 and the fixed portion 21. With respect to the characteristic of the magnetic suspending force, when the midpoint 02 of the movable portion 23 is at the coordinate origin 03, the fixed portion 21 is initialized from a non-superconductive state to a superconductive state by pouring liquid nitrogen into the cryostat 22. A magnetic suspending force characteristic obtained while the midpoint 02 of the movable portion 23 is being deviated downward by 30 mm is defined as a first deviation characteristic Q1 (see FIG. 10).

Figure 10:
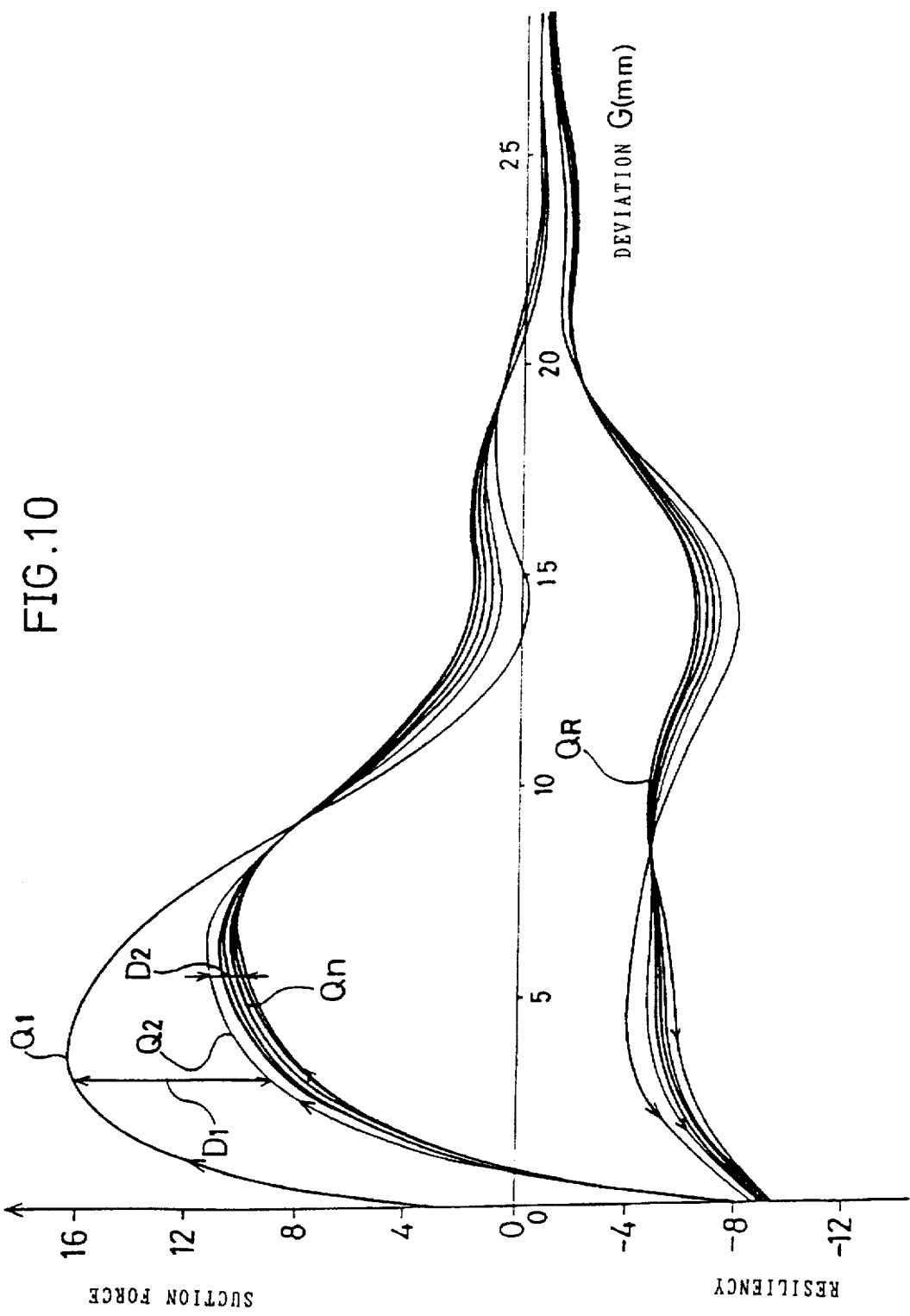
FIG. 10 is a characteristic diagram of a magnetic suspending force acting between the movable portion and the fixed portion when movable portion shown in FIG. 9 is deviated by 30 mm with respect to a coordinate origin.

In FIG. 10, the axis of ordinates indicates the magnetic suspending force (i.e., suction force) F (kgf), and the axis of abscissas indicates the deviation G. In this embodiment, the deviation G is from 0 mm to 30 mm.

In actual practice, the first deviation characteristic Q1 was measured according to the following procedure. First of all, the magnetism generating tubular movable portion 23 is brought into a semi-fixed state. After that, the tubular fixed portion 21 is brought into a superconductive state by pouring liquid nitrogen into the cryostat 22 and cooling the fixed portion 21. Subsequently, while maintaining the concentric relationship between the fixed portion 21 and the movable portion 23, the midpoint 01 of the fixed portion 21 is deviated upward from the origin 03 by 30 mm. The first deviation characteristic Q1 was measured in this way.

Next, a magnetic suspending force characteristic is defined as a second deviation characteristic Q2, which is obtained by returning the midpoint 02 of the movable portion 23 to the origin 03 and thereafter deviating the portion 23 downward, subsequently to the operation of the first deviation characteristic Q1. In addition, a group of magnetic suspending force characteristics obtained by repeating operations subsequent to the operation of the second deviation characteristic Q2 is defined as an n-th deviation characteristic group Qn. The second deviation characteristic Q2 and each characteristic of the n-th approach characteristic group Qn are smaller in magnetic suspending force than the first deviation characteristic Q1.

In practice, the second deviation characteristic Q2 and the n-th approach characteristic group Qn were measured according to the following procedure. First of all, the magnetism generating tubular movable portion 23 is brought into a semi-fixed state. After that, while maintaining the concentric relationship between the fixed portion 21 and the movable portion 23, the midpoint 01 of the fixed portion 21 is moved down from the upper position so as to return to the origin 03. Again, while maintaining the concentric relationship between the fixed portion 21 and the movable portion 23, the midpoint 01 of the fixed portion 21 is deviated from the origin 03 upward by 30 mm. A deviation characteristic obtained in this way is defined as the second deviation characteristic Q2. A group of magnetic suspending force characteristics obtained by repeating the operations subsequent to the operation of the second deviation characteristic Q2 is defined as the n-th approach characteristic group Qn. The measurement of the n-th approach characteristic group Qn was carried out 30 times. As the numerical value n (n is 3 or more) becomes larger, the characteristic variation (characteristic difference) between Qn and Qn−1 is lessened.

In FIG. 10, reference character Q, designates a deviation characteristic obtained when the midpoint 02 of the movable portion 23 is allowed to approach the origin 03 from a point spaced away from the origin 03.

As described above, when the positional relationship between the midpoint 01 of the fixed portion 21 and the midpoint 02 of the savable portion 23 is intentionally changed, in other words, when the savable portion 23 is deviated upward or downward, the magnetic suspending force characteristic presents a hysteresis phenomenon.

As can be seen in FIG. 10, with respect to each deviation characteristic of the n-th deviation characteristic group Qn, a difference D2 between the second deviation characteristic Q2 and that of the n-th deviation characteristic group Qn is substantially smaller than a difference D1 between the first deviation characteristic Q1 and the second deviation characteristic Q2.

Figure 11:
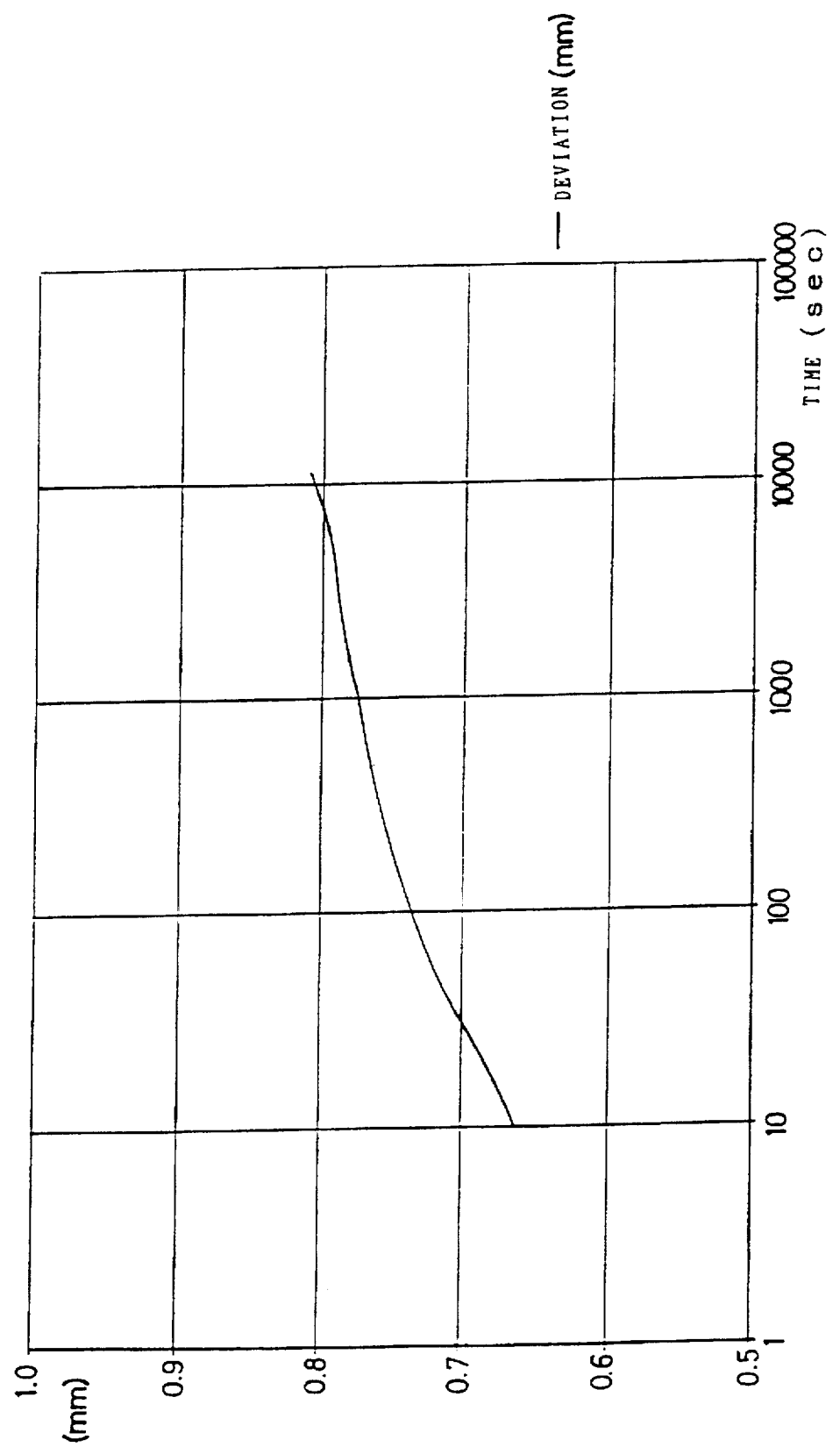
FIG. 11 is a diagram for explaining a drift of a first deviation characteristic of the movable portion shown in FIG. 9.
Figure 12:
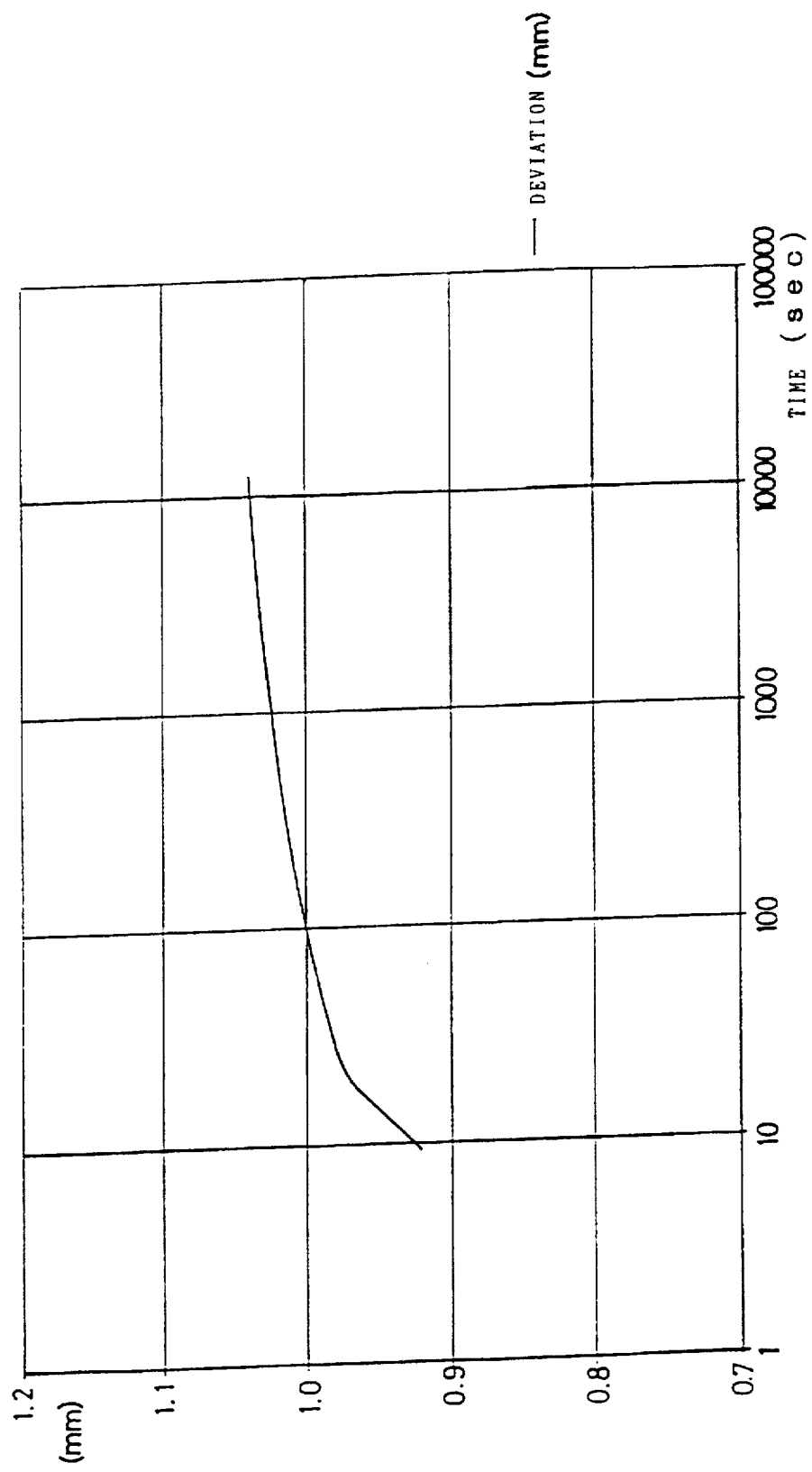
FIG. 12 is a diagram for explaining a drift of a second deviation characteristic of the movable portion shown in FIG. 9.

FIGS. 11 and 12 show measurement results of drifts about the first and second deviation characteristics Q1 and Q2, respectively. A load of 8 Kgf is applied to the movable portion 23 in the case of the first deviation characteristic Q1, and a load of 1 Kgf is applied to the movable portion 23 in the case of the second deviation characteristic Q2. On these conditions, time-series variations of the deviation are measured. When the deviation variation is measured within the range of loading-time 1000 sec. to loading-time 10000 sec., the drift of the second deviation characteristic Q2 is a third (⅓) as large as that of the first deviation characteristic Q1.

If the first deviation characteristic Q1 is applied to the superconducting apparatus constructed as shown in FIG. 9, the operations of the superconducting apparatus start at a position up to which the movable portion 23 is lowered when released at a rising startup part of the first deviation characteristic Q1 (i.e., when released immediately after initialization). In this case, if the deviation G is detected to be out of an allowable range by monitoring the drift, the operations of the superconducting apparatus are temporarily stopped and then the superconductor is initialized. The initialization frequency and the setting of the allowable range are determined depending on a superconducting apparatus to be used. If the second deviation characteristic Q2 is applied to the superconducting apparatus constructed as shown in FIG. 9, the operations of the superconducting apparatus start at a position where the movable portion 23 is lowered which has been released immediately after being intentionally caused to pass through the first deviation characteristic Q1 and the deviation characteristic $Q_R$ by the use of the hysteresis phenomenon shown in FIG. 10, in other words, which has been released at a rising startup part of the second deviation characteristic Q2.

If the first deviation characteristic Q1, the second deviation characteristic Q2, and the n-th deviation characteristic group Qn are used properly to construct the superconducting apparatus, the superconducting apparatus thus constructed can present a magnetic suspending force characteristic according to predetermined design. By the use of the first deviation characteristic Q1, it is possible to make the superconducting apparatus small-sized and light-weight and, in addition, to reduce construction costs. By the use of the second deviation characteristic Q2, it is possible to make the superconducting apparatus relatively small in drift and stable.

First Modification

Figure 13:
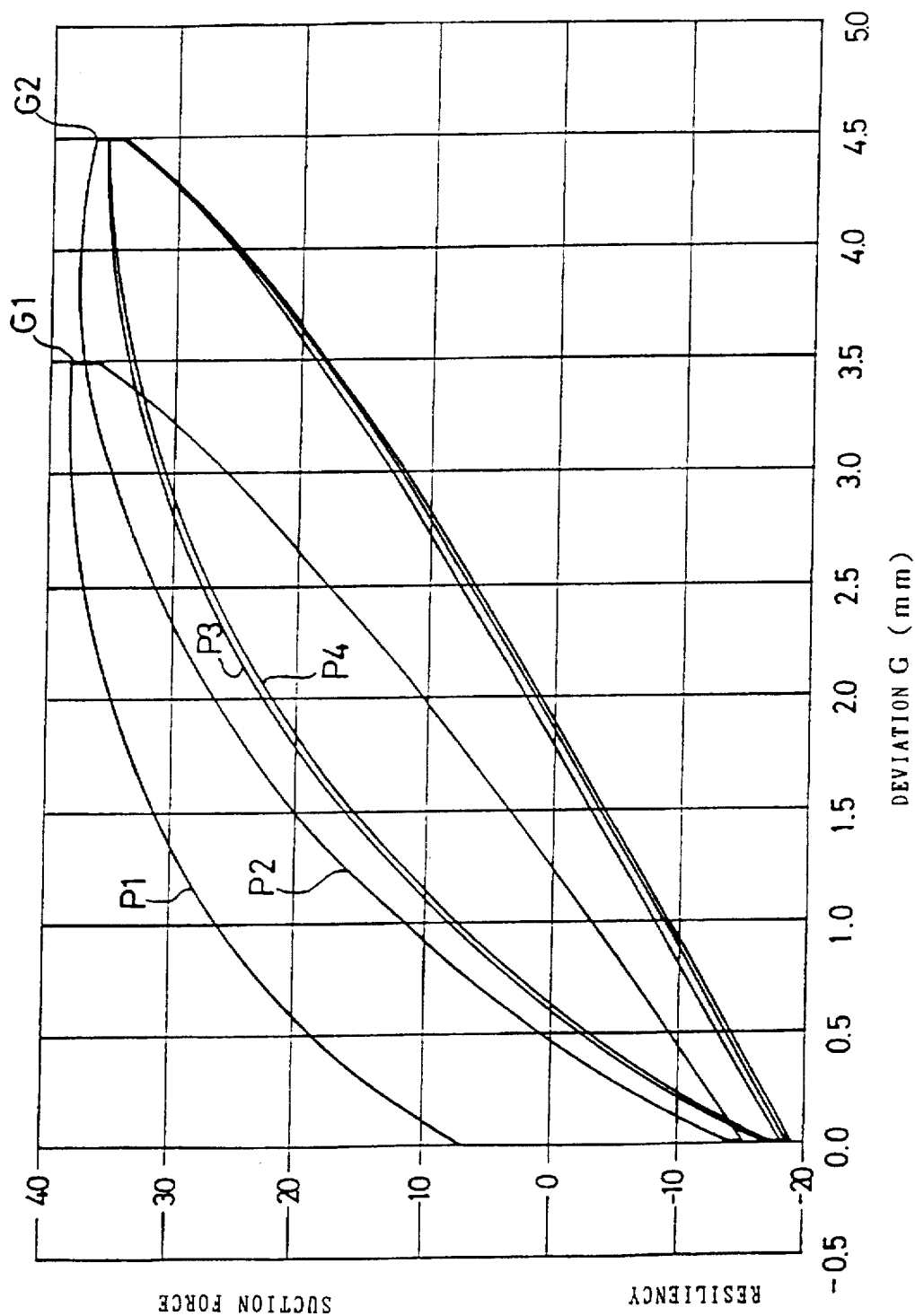
FIG. 13 is a diagram showing a hysteresis phenomenon of a characteristic of a magnetic suspending force acting between the movable portion and the fixed portion when taking steps of repeating that the movable portion shown in FIG. 9 is first deviated 0 to 3.5 mm and then is deviated 0 to 4.5 mm with respect to the coordinate origin.

A magnetic suspending force characteristic obtained when the midpoint 02 of the magnetism generating tubular movable portion 23 shown in FIG. 9 is deviated downward by 3.5 mm is defined as a first deviation characteristic P1 (see FIG. 13).

In FIG. 13, the axis of ordinates indicates a magnetic suspending force (i.e., suction force) F (Kgf), and the axis of abscissas indicates a deviation G.

In practice, the first deviation characteristic P1 was measured according to the following procedure. First of all, the magnetism generating tubular movable portion 23 is brought into a semi-fixed state. After that, while maintaining the concentric relationship between the tubular fixed portion 21 and the movable portion 23, the midpoint 01 of the fixed portion 21 is deviated upward by 3.5 mm (=G1) from the coordinate origin 03 in order to measure the first deviation characteristic P1. The deviation value (3.5 mm) used in this case is approximately the maximum value of a deviation value 61 of the first deviation characteristic P1.

A magnetic suspending force characteristic is defined as a second deviation characteristic P2, which is obtained by returning the midpoint 02 of the movable portion 23 to the coordinate origin 03 and thereafter deviating the midpoint 02 of the movable portion 23 downward again, subsequently to the operation of the first deviation characteristic P1. A group of magnetic suspending force characteristics obtained by repeating operations subsequent to the operation of the second deviation characteristic P2 is defined as an n-th deviation characteristic group Pn. The second deviation characteristic P2 and each characteristic of the n-th deviation characteristic group Pn are smaller in magnetic suspending force than the first deviation characteristic P1.

In practice, the second deviation characteristic P2 and each characteristic of the n-th deviation characteristic group Pn were measured according to the following procedure. First of all, the magnetism generating tubular movable portion 23 is brought into a semi-fixed state. Subsequently, while maintaining the concentric relationship between the fixed portion 21 and the movable portion 23, the midpoint 01 of the fixed portion 21 is moved down from the upper position so as to return to the coordinate origin 03. Without breaking off the concentric relationship therebetween, the measurement is made while deviating the midpoint 01 of the fixed portion 21 by 4.5 (=G2) mm upward from the origin 03 again. The deviation value (4.5 mm) used in this case is approximately the maximum of a deviation value G2 of the second deviation characteristic P2. The measurement of the n-th deviation characteristic group Pn (n is 3 or more) was made twice for convenience.

Reference character PR designates a deviation characteristic obtained when the midpoint 02 of the movable portion 23 is returned to the origin 03 from a position spaced away from the origin 03. When the positional relationship between the midpoint 01 of the fixed portion 21 and the midpoint 02 of the movable portion 23 is intentionally changed, in other words, when the movable portion is deviated upward or downward, the magnetic suspending force characteristic presents a hysteresis phenomenon.

A description of FIG. 14 will now be given. When the midpoint 02 of the movable portion 23 shown in FIG. 9 is at the coordinate origin 03, liquid nitrogen is poured into the cryostat 22, so that the fixed portion 21 is initialized to reach a superconductive state from a non-superconductive state. After that, the midpoint 02 of the movable portion 23 is deviated downward at 5 mm/min. After the suspending force arrives at the magnitude of 32 kgf (hereinafter referred to as PU kgf), a load is applied to the movable portion 23 for 3000 seconds (hereinafter referred to as TU1 sec.). A deviation value obtained when the magnitude of the suspending force arrives at PU kgf is referred to as G11. A deviation value obtained when 3000 seconds have elapsed from a point of time of G11 is referred to as G12. Next, the midpoint 02 of the movable portion 23 is reversed and deviated continuously upward at 5 mm/min until the magnitude of the suspending force arrives at 0 kgf (hereinafter referred to as PL kgf) from a point of time of G12. After the magnitude of the suspending force arrives at PL kgf, the load of the movable portion 23 is maintained at PL kgf for 60 seconds (hereinafter referred to as TL sec.). After the lapse of 60 seconds, the midpoint 02 of the savable portion 23 is continuously deviated downward until the magnitude of the suspending force arrives at PU kgf in such a way as that after the initialization. A deviation value obtained when the magnitude of the suspending force again arrives at PU kgf is referred to as G21. Subsequently, the load of PU kgf is applied to the movable portion 23 for 3000 seconds (hereinafter referred to as TU2 sec.). A deviation value obtained when 3000 seconds have elapsed from a point of time of G21 is referred to as G22.

Figure 14:
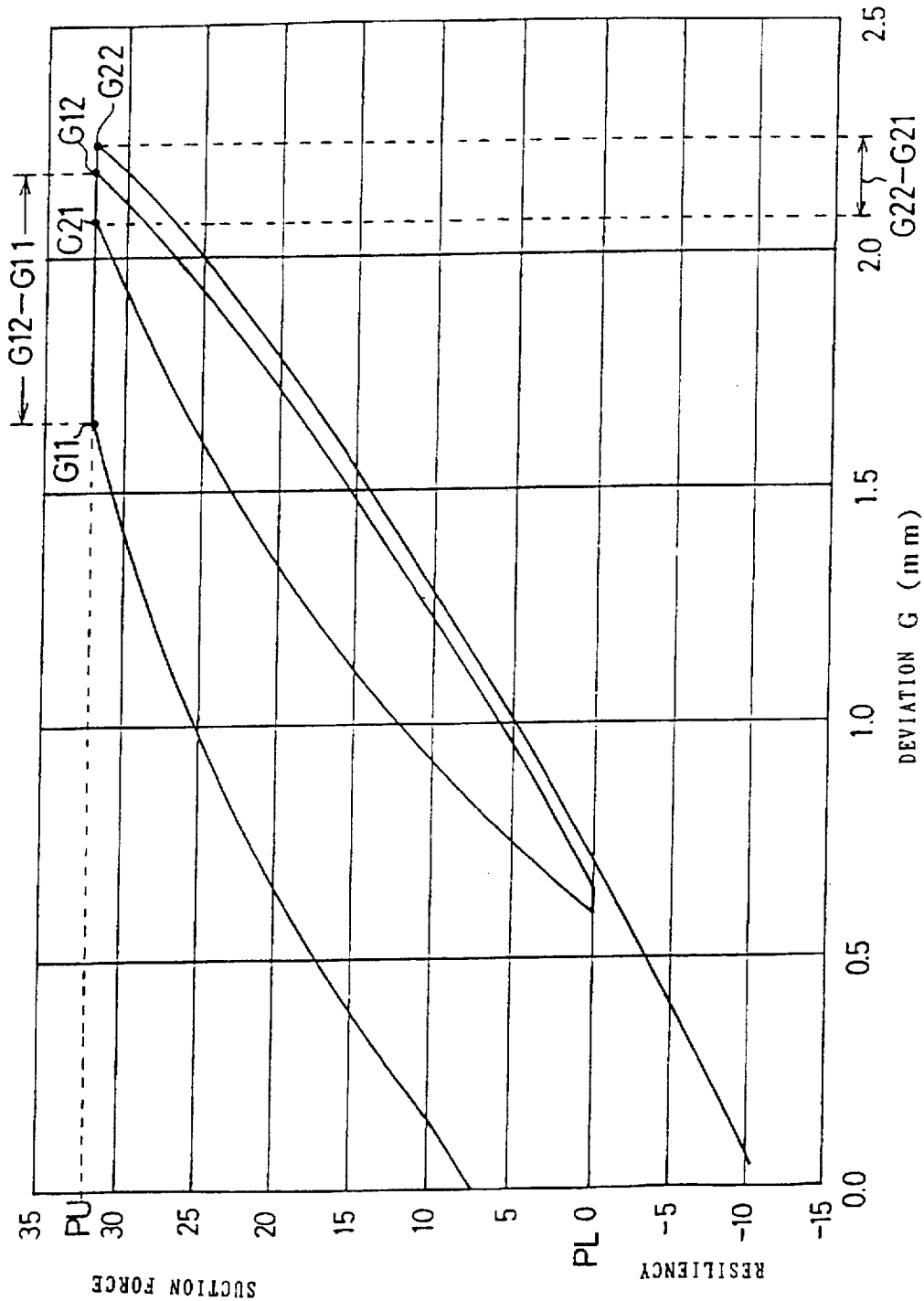
FIG. 14 is a characteristic diagram of a deviation occurring when a load of the movable portion shown in FIG. 9 is changed.

In FIG. 14, both a difference (G12–G11) on the first deviation characteristic P1 and a difference (G22–G21) on the second deviation characteristic P2 are each a variation in deviation during the passage of 3000 seconds (=TU1=TU2). As a result of insertion of operations for maintaining the load of PL kgf within the range in time-series of G12 to G21, the inequalities (G12–G11)>(G22–G21), (G12–G11)/TU1> (G1–G21)/TU2, and G12>G21 were obtained. The aforementioned operations for maintaining a load of PL kgf within the range in time-series of G12 to G21 are hereinafter referred to as reactivation.

Accordingly, it was revealed that, by the reaction, the second deviation characteristic P2 becomes more moderate than the first deviation characteristic P1 in variations in deviation with respect to a constant load.

In order to apply the aforementioned method to the superconducting apparatus constructed as shown in FIG. 9, the midpoint 02 of the movable portion 23 is fixed to the coordinate origin 03 in a semi-fixed state while applying the load of PU kgf to the movable portion 23. In that state, liquid nitrogen is poured into the cryostat 22, so that the fixed portion 21 is initialized from a non-superconductive state to a superconductive state. Thereafter, the movable portion 23 is released to start operations. Immediately after the release, the deviation value G11 increases as time progresses, and the value G11 arrives at the deviation value G12. At this time, the load of the movable portion 23 is reduced to be PL kgf for TL seconds in order to perform the reactivation. Thereafter, if the load of the movable portion 23 is restored, the rate of increase of the deviation 6 is lessened by the reactivation.

Since the deviation value 821, the time TU2, and the deviation value G22 are varied according to the manner of adjusting the deviation value G11, the time TU1, the deviation value G12, the load PL, and the time TL, it is possible to adjust the deviation value G11, the time TU1, the deviation value G12, the load PL, the time TL, and the time TU2 in agreement with usage conditions of the superconducting apparatus. In addition, it is possible to adjust the varying range of deviation to a desirable range thereof by performing the reactivation a plurality of times as occasion demands.

In the superconducting apparatus, it is unavoidable that a deviation increases in the superconductive magnetic bearing of the apparatus constructed as shown in FIG. 9 during the application of load. However, as described in this application of load, the reactivation serves to lessen the rate of increase of the deviation during the application of the load, and thereby on a drift be reduced based on a variation in deviation for a certain fixed time. In addition, advantageously, a superconducting apparatus can be provided which is relatively small in drift because it is adjustable to set a width of the drift within a fixed range.

Second Modification

The geometrical midpoint 02 of the magnetism generating tubular movable portion 23 shown in FIG. 9 is caused to coincide with the coordinate origin 03, and the superconductor is initialized. Starting from the time when the superconductor is initialized, the savable portion 23 is deviated downward at 5 mm/min. After the magnetic suspending force (i.e., the load) arrives at 30 kgf, the load of 30 kgf is maintained for 100 seconds (hereinafter referred to as load holding time).

In practice, both the midpoint 02 of the movable portion 23 and the midpoint 01 of the fixed portion 21 were caused to coincide with the coordinate origin 03 so that the movable portion 23 reaches a semi-fixed state. Liquid nitrogen was then poured into the cryostat 22 so as to cool the fixed portion 21. Thereby, the fixed portion 21 reached a superconductive state. Thereafter, the fixed portion 21 was deviated upward at 5 mm/min (see reference character (1) shown in FIG. 15) while maintaining the concentric relationship between the fixed portion 21 and the movable portion 23. After the magnetic suspending force (the load) arrived at 30 kgf, the load of 30 kgf was maintained for 100 seconds (see reference character (2) shown in FIG. 16).

Subsequently, the movable portion 23 is deviated upward at 5 mm/min until the load arrives at 0 kgf, and the load is maintained at 0 kgf for 100 seconds.

In practice, the fixed portion 21 was deviated downward at 5 mm/min until the magnetic suspending force arrived at 0 kgf. After the load reached 0 kgf, the load was maintained at 0 kgf for 100 seconds (see reference character (3) shown in FIG. 15).

Thereafter, the movable portion 23 is deviated downward at 5 mm/min until the load arrives at 30 kgf. After the magnetic suspending force (the load) has arrived at 30 kgf, the load is maintained at 30 kgf for 200 seconds.

In practice, the fixed portion S1 was deviated upward at 5 mm/min until the magnetic suspending force arrives at 30 kgf. After the load arrived at 30 kgf, the load was maintained at 30 kgf for 200 seconds (see reference character (4) shown in FIG. 15).

Thereafter, the movable portion 23 is deviated upward at 5 mm/min until the load arrives at 0 kgf. After the load has arrived at 0 kgf, the load is maintained at 0 kgf for 200 seconds.

In practice, the fixed portion 21 was deviated downward at 5 sa/min until the magnetic suspending force arrived at 0 kgf. After the load arrived at 0 kgf, the load was maintained at 0 kgf for 200 seconds (see reference character (5) shown in FIG. 15).

Thereafter, the movable portion 23 is deviated downward at 5 mm/min until the load arrives at 30 kgf. After the magnetic suspending force (the load) has arrived at 30 kgf, the load is maintained at 30 kgf for 300 seconds.

In practice, the fixed portion 31 was deviated upward at 5 mm/min until the magnetic suspending force arrived at 30 kgf. After the load arrived at 30 kgf, the load was maintained at 30 kgf for 300 seconds (see reference character (6) shown in FIG. 15)).

Thereafter, the movable portion 23 is deviated upward at 5 mm/min until the load arrives at 0 kgf. After the load has arrived at 0 kgf, the load is maintained at 0 kgf for 300 seconds.

In practice, the fixed portion 31 was deviated downward at 5 ma/min until the magnetic suspending force arrived at 0 kgf. After the load arrived at 0 kgf, the load was maintained at 0 kgf for 300 seconds (see reference character (7) shown in FIG. 15).

Figure 15:
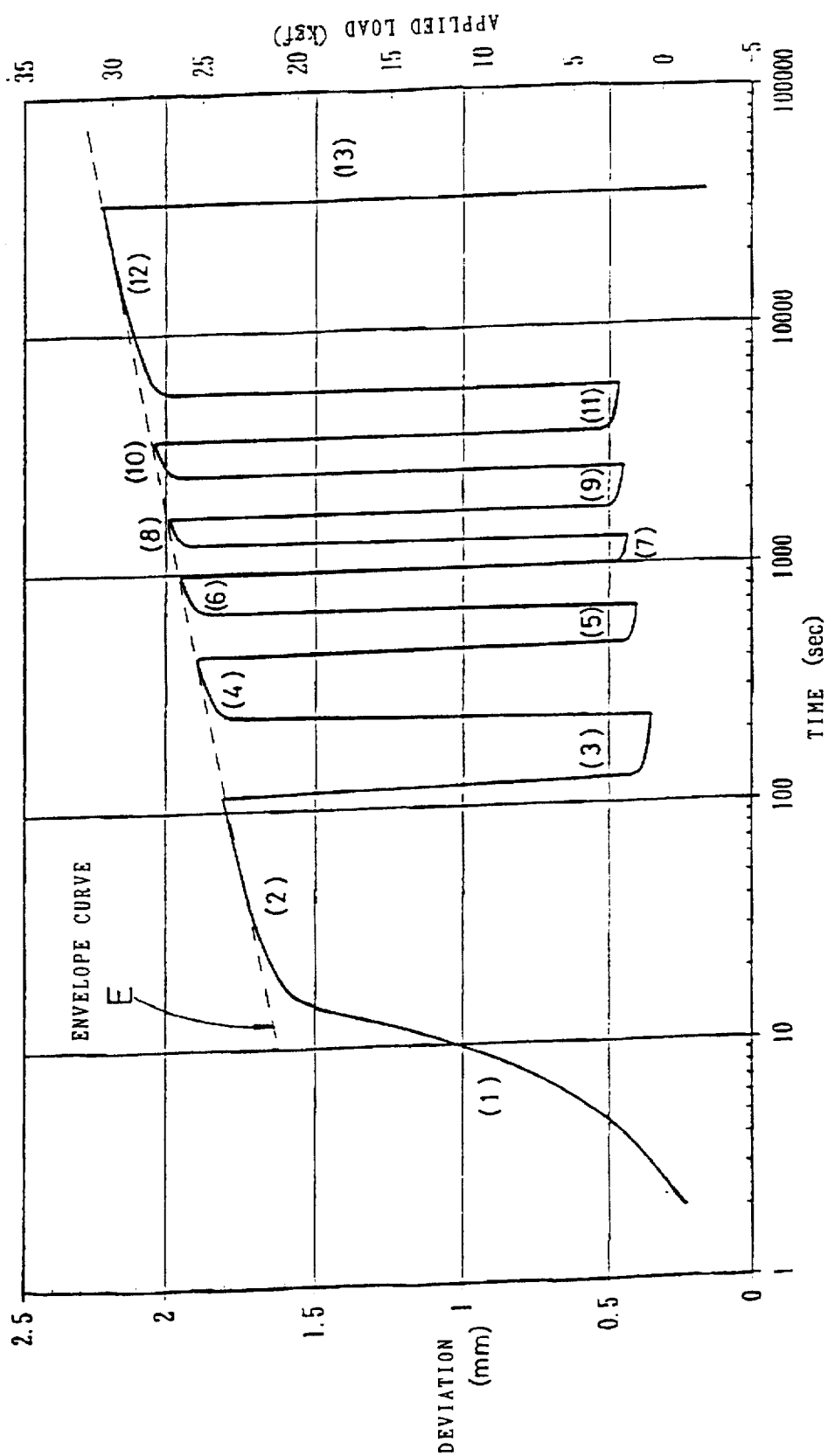
FIG. 15 is a characteristic diagram showing a relationship between time and deviation obtained when alternately repeating a case in which the load of the movable portion shown in FIG. 9 is kept for a fixed time in a state of 30 kilogram-force and a case in which the load thereof is kept for a fixed time in a state of 0 kilogram-force.

Thereafter, the operation relative to reference character (5) shown in FIG. 15 and the operation relative to reference character (6) shown in FIG. 15 are repeatedly carried out. With respect to the load of 30 kgf, the load holding time is varied to 400, 1000, and 3000 seconds. With respect to the load of 0 kgf, the load holding time is varied to 80 and 2000 seconds. In FIG. 15, reference character (8) designates a temporal variation in deviation (i.e., a variation in deviation with the lapse of time) obtained when the fixed portion 21 is maintained at 30 kgf for 400 seconds. reference character (9) designates a temporal variation in deviation obtained when the fixed portion 21 is maintained at 0 kgf for 800 seconds. Reference character (10) designates a temporal variation in deviation obtained when the fixed portion 21 is maintained at 30 kgf for 1000 seconds. Reference character (11) designates a temporal variation in deviation obtained when the fixed portion 21 is maintained at 0 kgf for 2000 seconds. Reference character (12) designates a temporal variation in deviation obtained when the fixed portion 21 is maintained at 30 kgf for 3000 seconds. Reference character (13) designates a relationship between a deviation and a suspending force in a case in which the fixed portion 21 is deviated downward at 5 mm/min so that the geometrical midpoint 01 is allowed to approach the coordinate origin 03. Reference character (1) designates a relationship between a deviation and a suspending force obtained when the fixed portion 21 is deviated upward at 5 mm/min.

In FIG. 15 showing time-series variations of the deviation, it is seen that, as the number of times of the reactivation increases, the rate of increase with the lapse of time of the deviation with respect to a given load can be lessened. Reference character E shown in FIG. 15 designates an envelope curve of the amount of deviation obtained when the load is maintained at 30 kgf. It is seen that the envelope curve E tends to be controlled by the elapsed time after the initialization of the superconducting apparatus shown in FIG. 9, rather than by the number of times of the reactivation.

In the superconducting apparatus, it is unavoidable that the deviation of the superconductive magnetic bearing constructed as shown in FIG. 9 increases during the application of a load. However, by lengthening a cycle of the reactivation or lengthening the elapsed time from the initialization to the start of operations in the second modification, the rate of increase of deviation during the application of the load can be lessened and, in addition, the drift can be reduced with respect to the variation amount of the deviation for a certain fixed time.

The superconducting apparatuses constructed as shown in the first and second embodiments can obtain the same advantageous effects as in this modification if the same operation as that of the superconducting apparatus shown in FIG. 9 is carried out.

Third Modification

Figure 16:
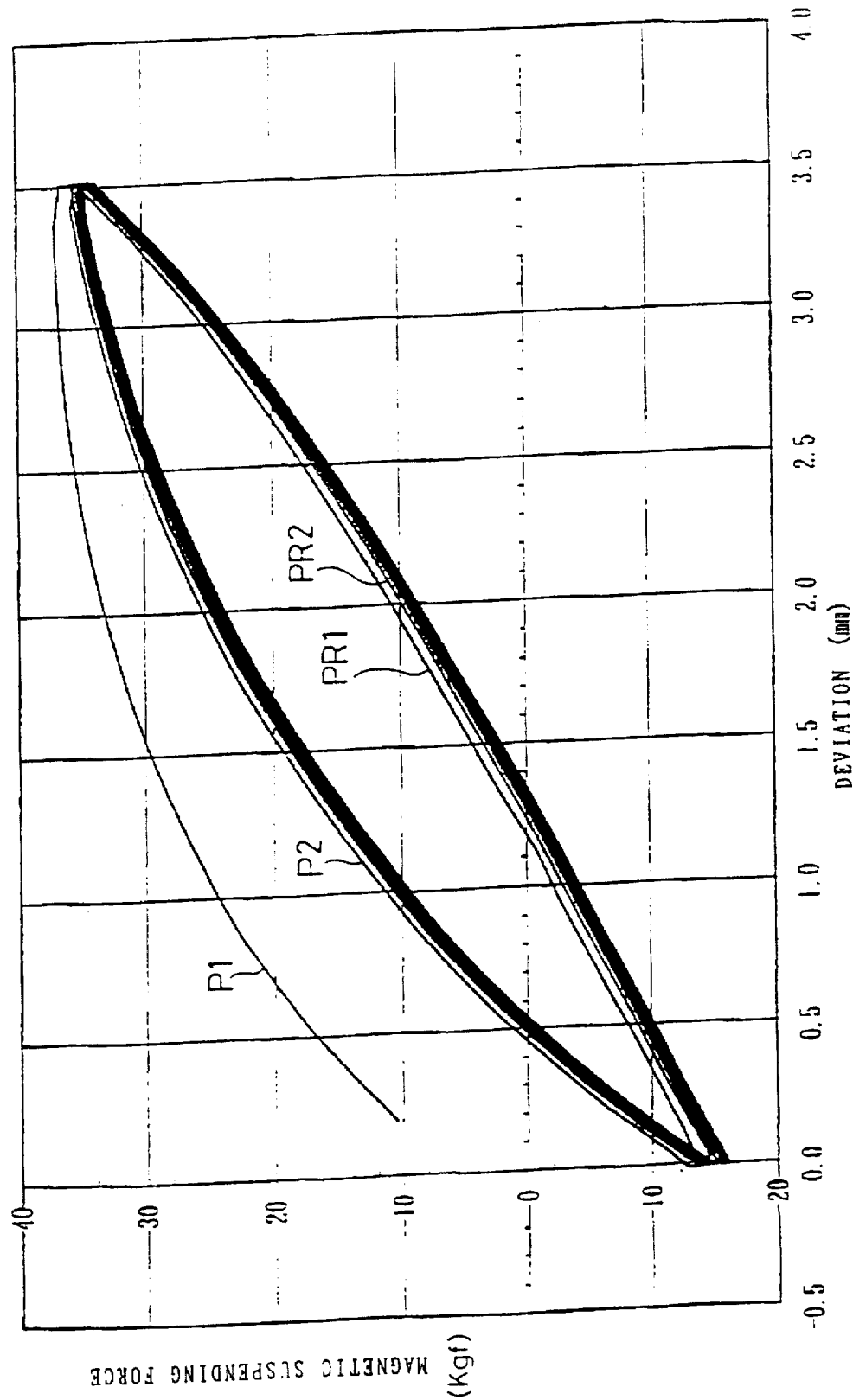
FIG. 16 is a diagram showing a hysteresis phenomenon of a characteristic of a magnetic suspending force acting between the movable portion and the fixed portion when ten times repeating that the movable portion shown in FIG. 9 is deviated 0 to 3.5 mm with respect to the coordinate origin.

FIG. 16 is a diagram of characteristics of a magnetic suspending force in a third modification. The axis of ordinates designates a magnetic suspending force F (kilogram-force abbreviated kgf) and the axis of abscissas designates a deviation G. Reference character P1 shown in FIG. 16 designates a characteristic of the magnetic suspending force obtained while the geometrical midpoint 02 of the movable portion 23 shown in FIG. 9 is being deviated downward by 3.5 mm (hereinafter referred to as a first deviation characteristic).

In practice, the first deviation characteristic P1 was measured according to the following procedure. First of all, the magnetism generating tubular movable portion 23 is brought into a semi-fixed state. After that, while maintaining the concentric relationship between the fixed portion 21 and the movable portion 23, the geometrical midpoint 01 of the fixed portion 21 is deviated by 3.5 mm upward from the coordinate origin 03, so that the first deviation characteristic P1 can be measured.

Next, a magnetic suspending force characteristic obtained when the geometrical midpoint 02 of the movable portion 23 is deviated upward to return to the coordinate origin 03 is defined as a first return deviation characteristic PR1. A magnetic suspending force characteristic obtained when the geometrical midpoint 02 of the movable portion 23 is deviated downward again is defined as a second deviation characteristic P2. Magnetic suspending force characteristics obtained by repeating the operations subsequent to the operations of the first return deviation characteristic PR1 and the second deviation characteristic P2 are defined as an n-th return deviation characteristic group PRn and an n-th deviation characteristic group Pn, respectively.

In practice, the first return deviation characteristic PR1, the second deviation characteristic P2, the n-th return deviation characteristic group PRn, and the n-th deviation characteristic group Pn were measured according to the following procedure. First of all, the movable portion 23 is brought into a half-fixed state. After that, while maintaining the concentric relationship between the fixed portion 21 and the movable portion 23, the geometrical midpoint 01 of the fixed portion 21 is moved down from the upper part so as to return to the coordinate origin 03. This magnetic suspending force characteristic is the first return deviation characteristic PR1. Thereafter, without breaking off the concentric relationship between the fixed portion 21 and the movable portion 23, the measurement is taken while again deviating the geometrical midpoint 01 of the fixed portion 21 by 3.5 mm upward from the coordinate origin 03. The magnetic suspending force characteristic obtained at this time is the second deviation characteristic P2. Thereafter, without breaking off the concentric relationship between the fixed portion 21 and the movable portion 23, the measurement is taken while suspending the geometrical midpoint 01 of the fixed portion 21 downward from the upper part so as to return to the coordinate origin 03. This magnetic suspending force characteristic is the second return deviation characteristic PR2.

The n-th return deviation characteristic group PRn and the n-th deviation characteristic group Pn which are obtained by operations subsequent to the aforementioned operations were measured ten times, but the present invention is not necessarily limited to this number of times.

Figure 17:
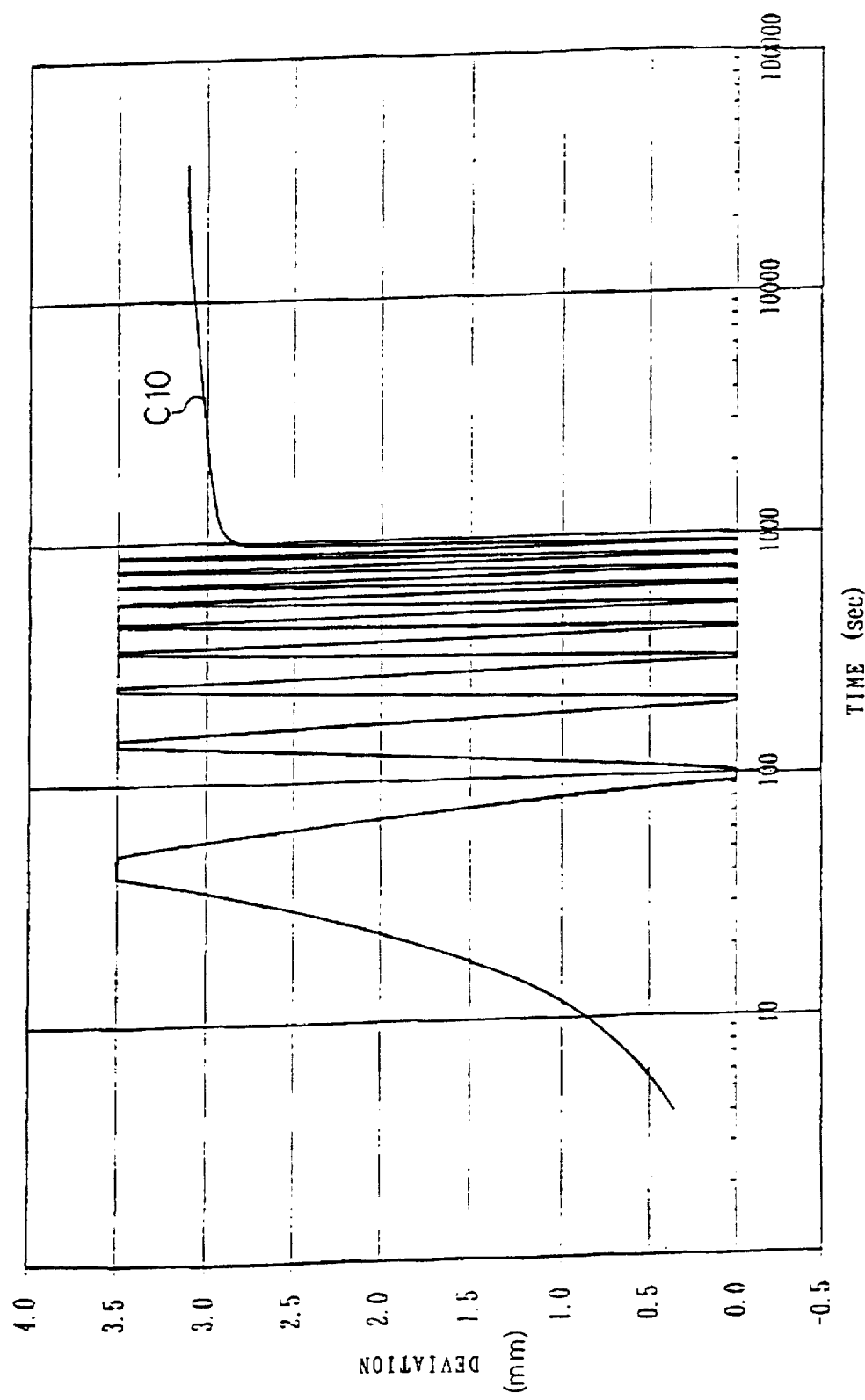
FIG. 17 is a diagram showing a time-series variation characteristic curve of a deviation obtained when the load of the movable portion is kept at 30 kilogram-force in the midst of a 10th deviation characteristic of the magnetic suspending force shown in FIG. 16.

FIG. 17 will now be described. When the geometrical midpoint 02 of the movable portion 23 shown in FIG. 9 is at the coordinate origin 03, liquid nitrogen is poured into the cryostat 22, so that the fixed portion 21 is initialized from a non-superconductive state to a superconductive state. Thereafter, the operations of reference characters P1, PR1, P2, PR2, . . . , P9, PR9 shown in FIG. 16 are repeatedly carried out. The magnetic suspending force (the load) is then maintained at 30 kgf on the midway of a rising startup part of P10 and at the time when the load has arrived at 30 kgf. FIG. 17 shows a time-series variation of a deviation occurring at this time. In FIG. 17, reference character C10 designates a characteristic curve of a time-series variation of a deviation obtained when the load is maintained at 30 kgf after the operations of reference characters P1, PR1, P2, PR2, . . . , P9, PR9 shown in FIG. 16 are repeatedly carried out and after the load has arrived at 30 kgf in the operation of P10.

Figure 18:
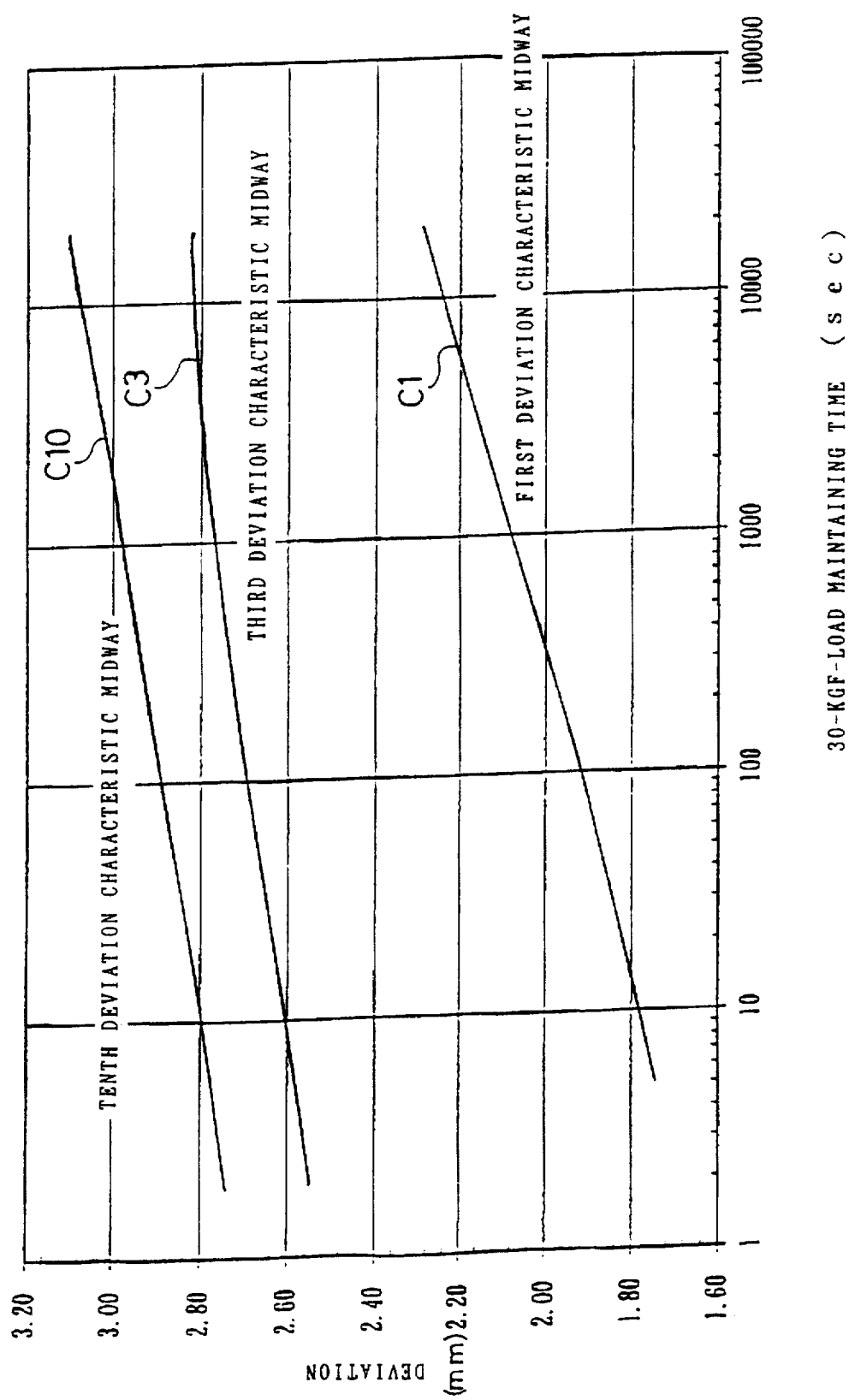
FIG. 18 is a diagram showing time-series variation characteristic curves of the deviation in the midst of first, third, and 10th deviation characteristics obtained when the load of the movable portion is kept at 30 kilogram-force in the midst of the first, third, and 10th deviation characteristics of a hysteresis curve of the magnetic suspending force shown in FIG. 16, respectively.

FIG. 18 will now be described. When the geometrical midpoint 02 of the movable portion 23 shown in FIG. 9 is at the coordinate origin 02, liquid nitrogen is poured into the cryostat ss, so that the fixed portion 21 is initialized from a non-superconductive state to a superconductive state. Thereafter, the magnetic suspending force (the load) is maintained at 30 kgf on the midway of a rising startup part of P1 shown in FIG. 16 and at the time when the magnetic suspending force (the load) has arrived at 30 kgf. Reference character C1 in FIG. 18 designates a time-series variation of a deviation obtained at this time. Reference character C3 in FIG. 18 designates a time-series variation of a deviation obtained in the following way. When the geometrical midpoint 02 of the movable portion 23 shown in FIG. 9 is at the coordinate origin 03, Liquid nitrogen is poured into the cryostat 22, so that the fixed portion 21 is initialized from a non-superconductive state to a superconductive state. Thereafter, the load is maintained at 30 kgf on the midway of a rising startup part of P3 shown in FIG. 16 and at the time when the magnetic suspending force (the load) has arrived at 30 kgf. The variation obtained at this time is shown by reference character C3.

Figure 19:
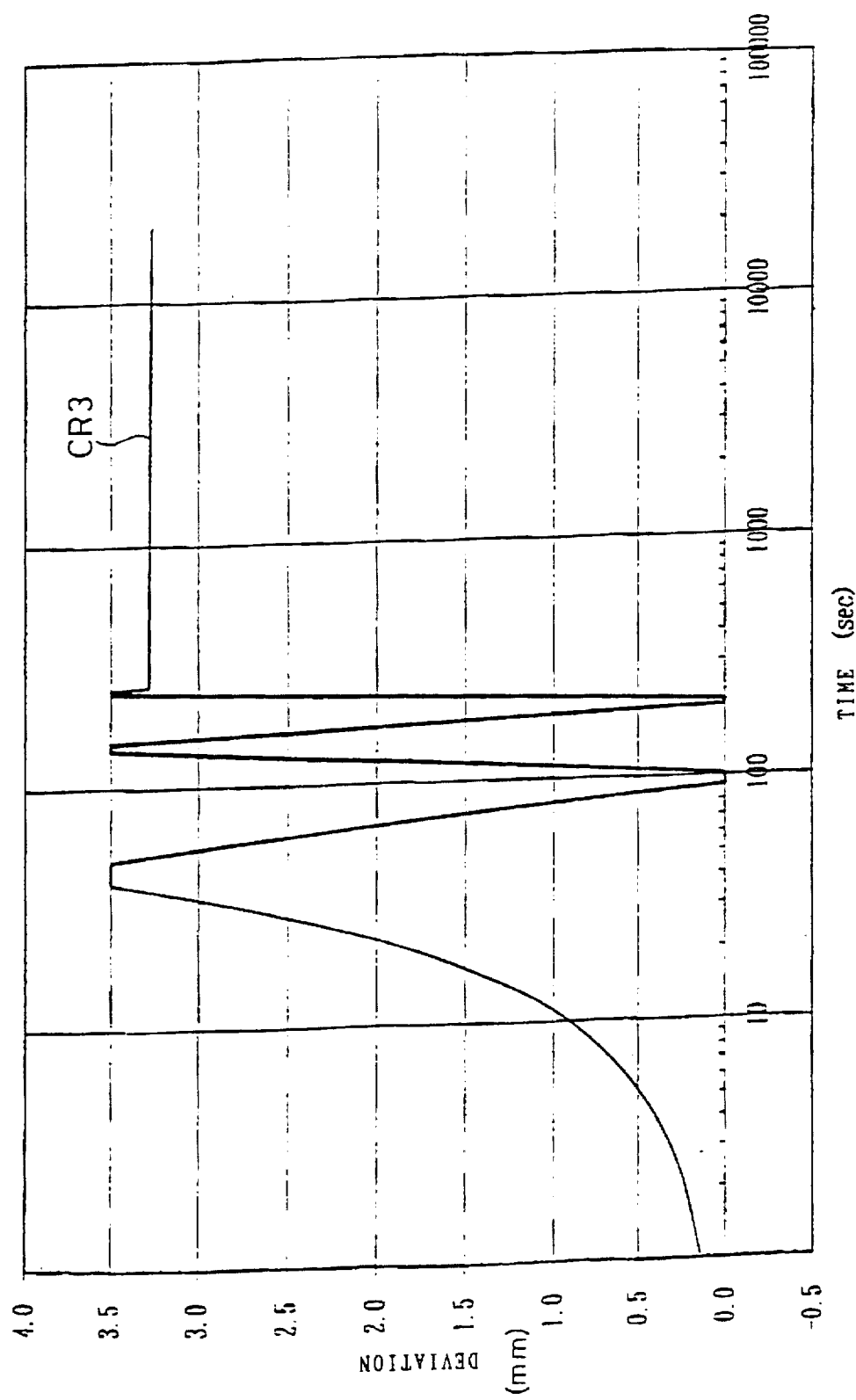
FIG. 19 is a diagram showing a time-series variation characteristic curve of the deviation obtained when the load of the movable portion is kept at 30 kilogram-force in the midst of a third return characteristic of the magnetic suspending force shown in FIG. 16.

FIG. 19 will now be described. When the geometrical midpoint 02 of the movable portion 23 is at the coordinate origin 03, liquid nitrogen is poured into the cryostat 22, so that the fixed portion 21 is initialized from a non-superconductive state to a superconductive state. Thereafter, the operations of reference characters P1, PR1, P2, PR2, P3, and PR3 shown in FIG. 16 are repeatedly carried out. The magnetic suspending force (the load) is then maintained at 30 kgf on the midway of the return of PR3 and at the time when the magnetic suspending force (the load) has arrived at 30 kgf. FIG. 19 shows a time-series variation of a deviation occurring at this time. In FIG. 19, reference character CR3 designates a characteristic curve of a time-series variation of a deviation obtained when the load is maintained at 30 kgf after the operations of reference characters P1, PR1, P2, PR2, and P3 are repeatedly carried out and after the load has arrived at 30 kgf in the operation of PR3.

Figure 20:
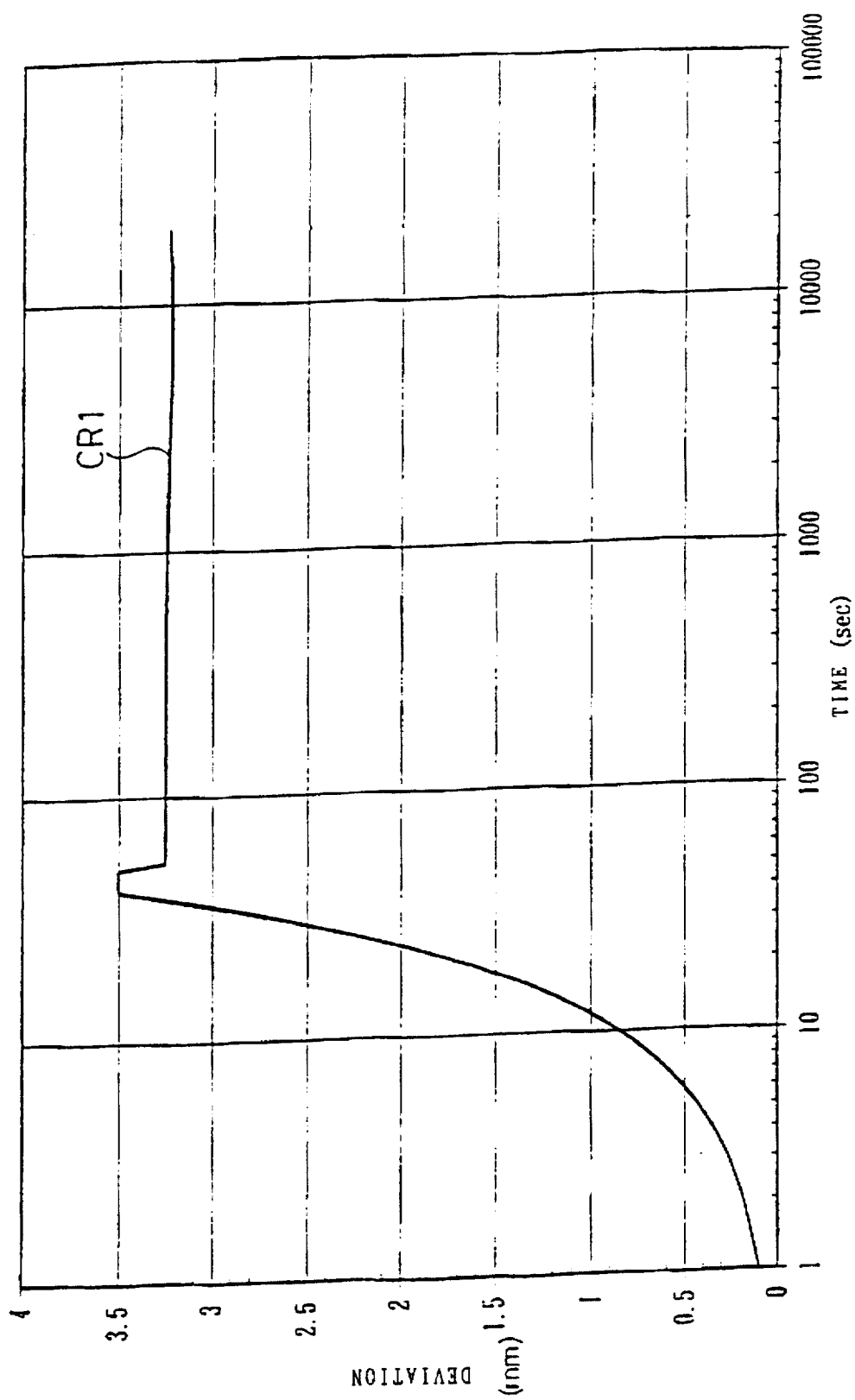
FIG. 20 is a diagram showing a time-series variation characteristic curve of the deviation obtained when the load of the movable portion is kept at 30 kilogram-force in the midst of a first return characteristic of the magnetic suspending force shown in FIG. 16.

FIG. 20 will now be described. When the geometrical midpoint 02 of the movable portion 23 is at the coordinate origin 03, liquid nitrogen is poured into the cryostat 22, so that the fixed portion 21 is initialized from a non-superconductive state to a superconductive state. Thereafter, the operation of reference character P1 shown in FIG. 16 is carried out. The magnetic suspending force (the load) is then maintained at 30 kgf on the midway of the return of PR1 and at the time when the magnetic suspending force (the load) has arrived at 30 kgf. FIG. 20 shows a time-series variation of a deviation occurring at this time. In FIG. 20, reference character CR1 designates a characteristic curve of a time-series variation of a deviation obtained when the load is maintained at 30 kgf after the operation of reference character P1 is carried out and after the load has arrived at 30 kgf in the operation of PR1.

Figure 21:
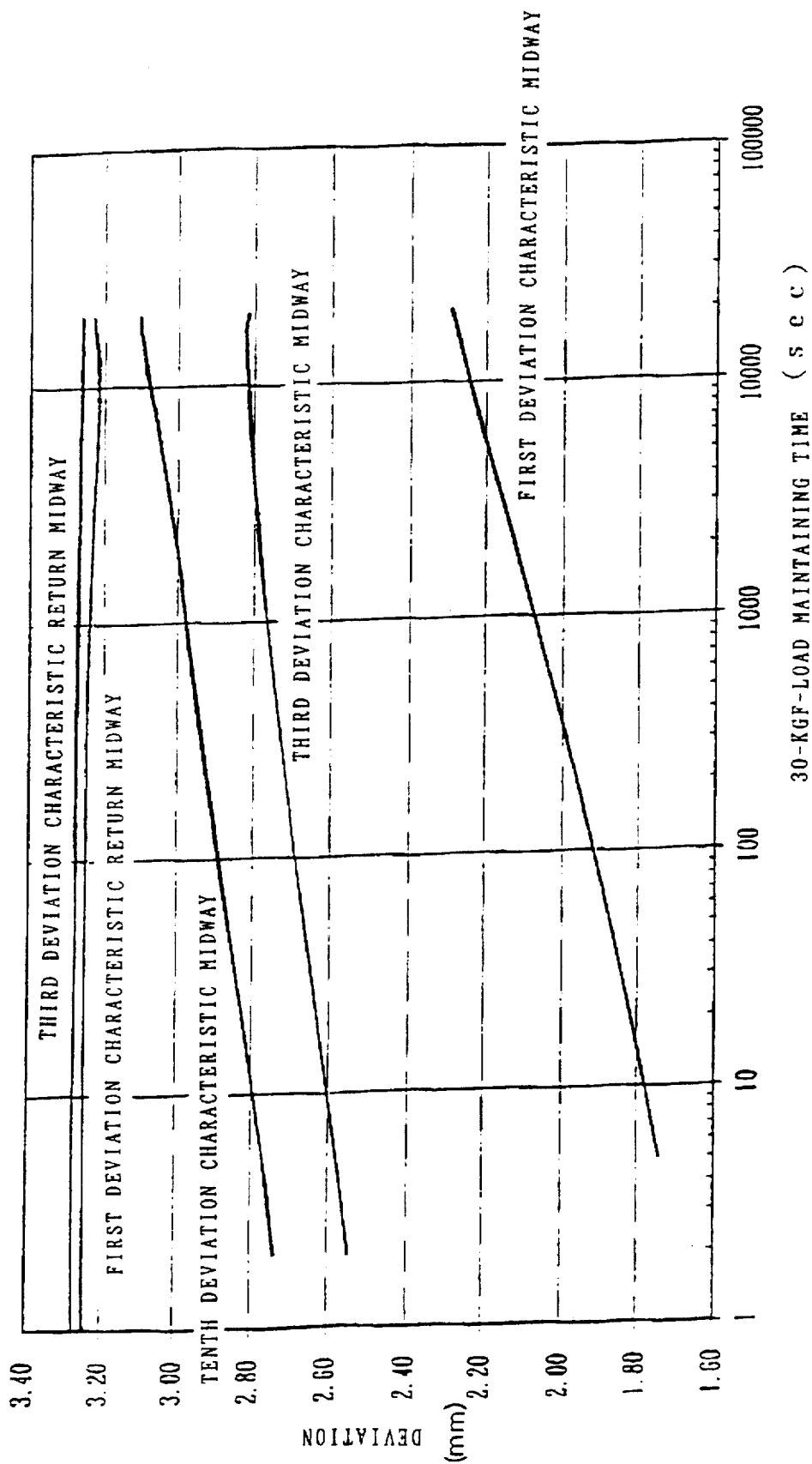
FIG. 21 is a diagram in which the time-series variation characteristic curves of the deviation shown in FIG. 18 are shown together with the time-series variation characteristic curves of the deviation shown in FIGS. 19 and 20.

FIG. 21 is a diagram in which the time-series variation characteristic curves of the deviation shown in FIG. 18 are shown together with the time-series variation characteristic curves of the deviation shown in FIGS. 19 and 20. It can be seen in FIG. 21 that the rate of variation with the lapse of time of the deviation with respect to the same load depends largely on the hysteresis of a magnetic suspending force characteristic.

In the superconducting apparatus, it is unavoidable that the deviation of the superconductive magnetic bearing constructed as shown in FIG. 9 varies during the application of a load. However, according to the third modification, the rate of variation of deviation with the lapse of time during the application of the load can be lessened.

The superconducting apparatuses constructed as shown in the first and second embodiments can obtain the same advantageous effects as in this modification if the same operation as that of the superconducting apparatus shown in FIG. 9 is carried out.

Fourth Modification

A fourth modification will be described with reference to FIGS. 22 and 23.

Figure 22:
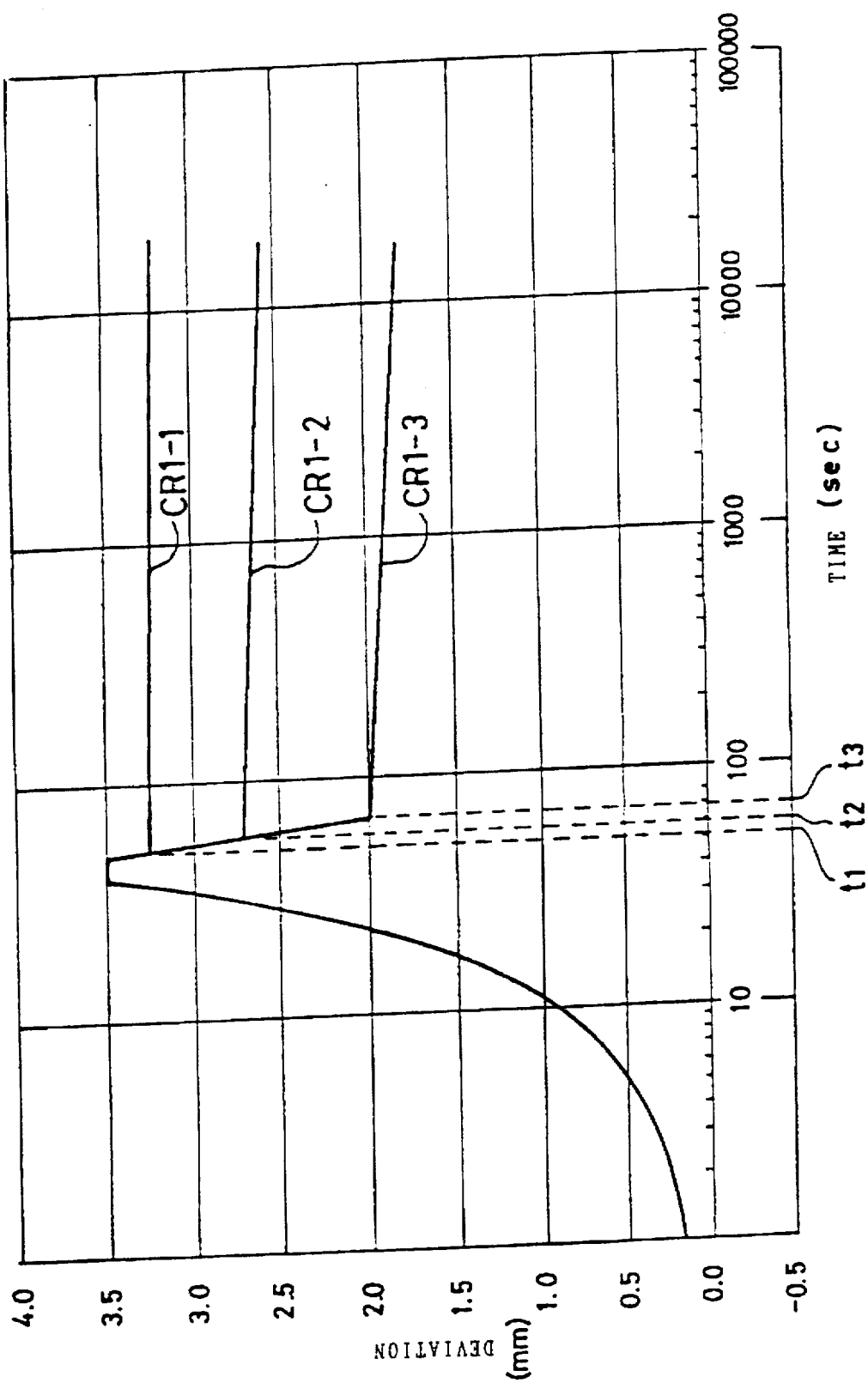
FIG. 22 is a diagram showing a time-series variation characteristic curve of a deviation obtained when the load of the movable portion is kept at 10 kgf, 20 kgf, and 30 kgf in the midst of the first return characteristic of the magnetic suspending force shown in FIG. 16.

FIG. 22 shows the time-series variation of a deviation which is obtained in the following way. When the geometrical midpoint 02 of the magnetism generating tubular movable portion 23 is at the coordinate origin 03, liquid nitrogen is poured into the cryostat 22, so that the tubular fixed portion is initialized from a non-superconductive state to a superconductive state. Thereafter, the operation of reference character P1 shown in FIG. 16 is carried out, and the load is maintained at 10 kgf, 20 kgf, and 30 kgf on the midway of the return of reference character PR1 and at the time when the magnetic suspending force (the load) has arrived at 10 kgf, 20 kgf, and 30 kgf, respectively.

A description of FIG. 16 will be emitted because it has already been given in Third Modification.

In FIG. 22, reference character CR1–1 designates a characteristic curve of the time-series variation of a deviation obtained such that the operation of P1 is carried out and the load is then maintained at 30 kgf after the load has arrived at 30 kgf under the operation of PR1. Reference character CR1–2 designates a characteristic curve of the time-series variation of a deviation obtained such that the operation of P1 is carried out and the load is then maintained at 20 kgf after the load has arrived at 20 kgf under the operation of PR1. Reference character CR1–3 designates a characteristic curve of the time-series variation of a deviation obtained such that the operation of P1 is carried out and the load is then maintained at 10 kgf after the load has arrived at 10 kgf under the operation of PR1.

Figure 23:
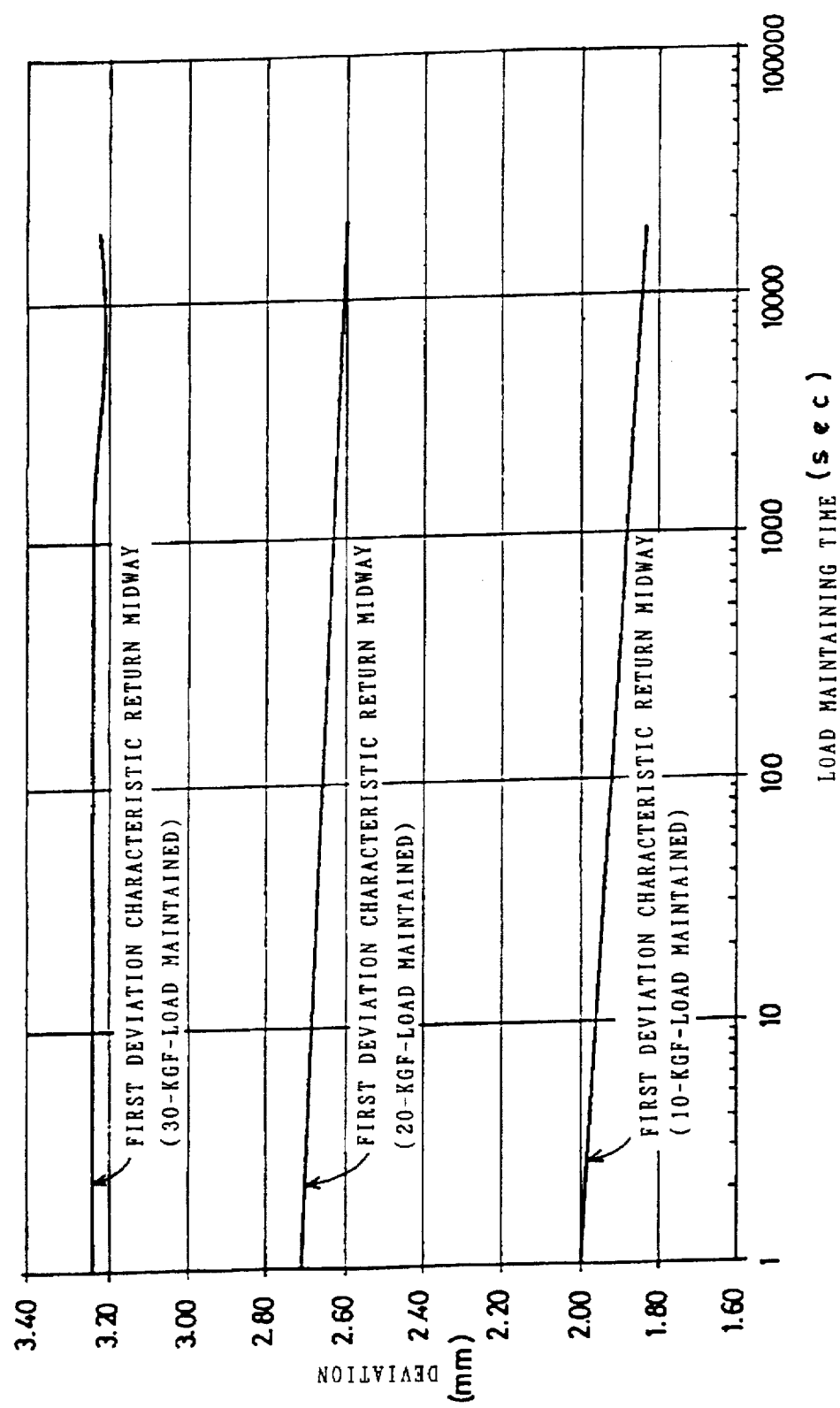
FIG. 23 is a drawing in which the characteristic curves of FIG. 22 are redrawn by aligning the respective time-axes of the characteristic curves.

FIG. 23 is a graph in which the respective time-axes of the characteristic curves shown in FIG. 22 are aligned. In other words, in the graph, times t1, t2, and t3 shown in FIG. 22 are caused to coincide with each ether and thereby the characteristic curves CR1–1, CR1–2, and CR1–3 are redrawn.

As can be seen in FIG. 23, the suspending force is increased in time-series by the load and the hysteresis of magnetic suspending force characteristics.

In the superconducting apparatus, it is unavoidable that the deviation of the superconductive magnetic bearing constructed as shown in FIG. 9 is varied during loading, but it is possible to lower the rate of variation with the lapse of time of a deviation during loading more than the third modification alone is applied if the third modification is applied in combination with the fourth modification.

Referring to the superconducting apparatuses constructed as shown in the first and second embodiments, they can obtain similar effects if the same operation as in the superconducting apparatus shown in FIG. 9 is carried out.

As described above, according to the respective aspects of the present invention, the constructed superconducting apparatus can obtain a magnetic floating characteristic or a magnetic suspending characteristic after predetermined design.

The superconducting apparatus can also be designed according to a method obtained by organically combining the designing methods of the first to third embodiments.

What is claimed is:

1. A method of designing a superconductivity employing apparatus by the use of characteristics of a magnetic floating force acting between a magnetism generating disk-shaped floatable portion and a disk-shaped fixed portion capable exhibiting superconductivity, said method comprising the steps of:

causing said magnetism generating disk-shaped floatable portion to face said disk-shaped fixed portion capable of exhibiting superconductivity with a gap therebetween, said magnetism generating disk-shaped floatable portion being situated above said disk-shaped fixed portion;

initializing said disk-shaped fixed portion from a non-superconductive state to a superconductive state at a position where said magnetism generating disk-shaped floatable portion is spaced away from said disk-shaped fixed portion to such an extent that magnetic field of said magnetism generating disk-shaped floatable portion does not influence said disk-shaped fixed portion; and properly using a first approach characteristic, a second approach characteristic, and each approach characteristic of an n-th approach characteristic group in order to construct the superconductivity employing apparatus when a difference between each approach characteristic of the n-th approach characteristic group and the second approach characteristic is substantially smaller than a difference between the first approach characteristic and the second approach characteristic, where the first approach characteristic is a characteristic of a magnetic floating force obtained by allowing said magnetism generating disk-shaped floatable portion to approach said disk-shaped fixed portion, the second approach characteristic is a characteristic of a magnetic floating force obtained by allowing said magnetism generating disk-shaped floatable portion to approach said disk-shaped fixed portion after said magnetism generating disk-shaped floatable portion is allowed to recede from said disk-shaped fixed portion to such an extent that a magnetic field of said magnetism generating disk-shaped floatable portion does not influence said disk-shaped fixed portion subsequently to an operation of said first approach characteristic, and the n-th approach characteristic group is a group of characteristics of a magnetic floating force obtained by repeatedly carrying out operations subsequent to an operation of said second approach characteristic.

2. A superconductivity employing apparatus designed by the method as recited in claim 1.

3. A method of designing a superconductivity employing apparatus, comprising the steps of:

causing a magnetism generating disk-shaped suspendible portion to face a disk-shaped fixed portion capable of exhibiting superconductivity with a gap therebetween, said magnetism generating disk-shaped suspendible portion being situated below said disk-shaped fixed portion;

initializing said disk-shaped fixed portion from a non-superconductive state to a superconductive state at a position where said magnetism generating disk-shaped suspendible portion is close to said disk-shaped fixed portion; and with respect to characteristics of a magnetic suspending force acting between said magnetism generating disk-shaped suspendible portion and said disk-shaped fixed portion, properly using a first recession characteristic, a second recession characteristic, and each recession characteristic of an n-th recession characteristic group in order to construct the superconductivity employing apparatus when a difference between the each recession characteristic of the n-th recession characteristic group and the second recession characteristic is substantially smaller than a difference between the first recession characteristic and the second recession characteristic, where the first recession characteristic is a characteristic of a magnetic suspending force obtained by allowing said magnetism generating disk-shaped suspendible portion to recede from said disk-shaped fixed portion to such an extent that a magnetic field of said magnetism generating disk-shaped suspendible portion does not influence said disk-shaped fixed portion, the second recession characteristic is a characteristic of a magnetic suspending force obtained by allowing said magnetism generating disk-shaped suspendible portion to recede from said disk-shaped fixed portion to such an extent that a magnetic field of said magnetism generating disk-shaped suspendible portion does not influence said disk-shaped fixed portion after said magnetism generating disk-shaped suspendible portion is allowed to approach said disk-shaped fixed portion subsequently to an operation of the first recession characteristic, and the n-th recession characteristic group is a group of characteristics of a magnetic suspending force obtained by repeatedly carrying out operations subsequent to an operation of the second recession characteristic.

4. A superconductivity employing apparatus designed by the method as recited in claim 3.

5. A method of designing a superconductivity employing apparatus, comprising the steps of:

causing a magnetism generating tubular movable portion to face a tubular fixed portion capable of exhibiting superconductivity with a gap therebetween, said magnetism generating tubular movable portion surrounding said tubular fixed portion radially outwardly from said tubular fixed portion;

defining a spatial position as a coordinate origin, where a geometrical midpoint in a height direction of said tubular fixed portion and a geometrical midpoint in a height direction of said magnetism generating tubular movable portion are caused to coincide with each other in a horizontal direction;

initializing said tubular fixed portion from a non-superconductive state to a superconductive state when said magnetism generating tubular movable portion is situated at the coordinate origin, and with respect to characteristics of a magnetic suspending force acting between said magnetism generating tubular movable portion and said tubular fixed portion when said magnetism generating tubular movable portion is deviated upward and downward from the coordinate origin, properly using a first deviation characteristic, a second deviation characteristic, and each deviation characteristic of an n-th deviation characteristic group in order to construct the superconductivity employing apparatus when a difference between the each deviation characteristic of the n-th deviation characteristic group and the second deviation characteristic is substantially smaller than a difference between the first deviation characteristic and the second deviation characteristic, where the first deviation characteristic is a characteristic of a magnetic suspending force obtained by deviating the midpoint of said magnetism generating tubular movable portion downward from the coordinate origin, the second deviation characteristic is a characteristic of a magnetic suspending force obtained by deviating the midpoint of said magnetism generating tubular movable portion downward from the coordinate origin after said magnetism generating tubular movable portion is returned to the coordinate origin subsequently to an operation of the first deviation characteristic, and the n-th deviation characteristic group is a group of characteristics of a magnetic suspending force obtained by repeatedly carrying out operations subsequent to an operation of the second deviation characteristic.

6. A superconductivity employing apparatus designed by the method as recited in claim 5.

7. A superconductivity employing apparatus as recited in claim 2, wherein said magnetism generating disk-shaped floatable portion has a permanent magnet.

8. A superconductivity employing apparatus as recited in claim 4, wherein said magnetism generating disk-shaped suspendible portion has a permanent magnet.

9. A superconductivity employing apparatus as recited in claim 6, wherein said magnetism generating disk-shaped tubular movable portion has a permanent magnet.

* * * * *